United States Patent [19]

Nogami et al.

[11] Patent Number: 5,355,226
[45] Date of Patent: Oct. 11, 1994

[54] RECORDING-REPRODUCTION APPARATUS APPLYING DOUBLE RESET TO THE PHASE OF AN FM CARRIER

[75] Inventors: Hiroaki Nogami, Matsudo; Soichi Iwamura, Fuchu, both of Japan

[73] Assignee: Sharp Kabushiki Kaisha, Osaka, Japan

[21] Appl. No.: 831,214

[22] Filed: Feb. 7, 1992

[30] Foreign Application Priority Data

Feb. 8, 1991 [JP] Japan ................................. 3-017980
Mar. 13, 1991 [JP] Japan ................................. 3-048391

[51] Int. Cl.$^5$ ............................................. H04N 9/80
[52] U.S. Cl. .................................. 358/326; 358/330; 358/320; 348/506; 348/507
[58] Field of Search ............... 358/310, 330, 326, 315, 358/316, 318, 319, 320, 323, 324–327, 17, 19, 20, 23, 25; 348/500, 501, 506; H04N 9/79, 9/80

[56] References Cited

U.S. PATENT DOCUMENTS

| | | | |
|---|---|---|---|
| 4,839,615 | 6/1989 | Sato | 332/18 |
| 5,045,950 | 9/1991 | Iwamura et al. | 358/327 |
| 5,157,359 | 10/1992 | Nogami et al. | 358/330 |

FOREIGN PATENT DOCUMENTS

| | | |
|---|---|---|
| 0289046 | 11/1988 | European Pat. Off. . |
| 0447210A2 | 9/1991 | European Pat. Off. . |
| 2450759 | 4/1976 | Fed. Rep. of Germany . |
| 2658388A1 | 6/1978 | Fed. Rep. of Germany . |

OTHER PUBLICATIONS

S. Iwamura, et al., "Lower Shifting FM Carrier Recording In HD VCR For Baseband/Muse Signals," Digest of Techinical Papers, International Conference on Consumer Electronics, 188 (Jun. 5–7, 1991( (In English).

Primary Examiner—Tommy P. Chin
Assistant Examiner—Khoi Truong
Attorney, Agent, or Firm—David G. Conlin; Robert F. O'Connell; Kevin J. Fournier

[57] ABSTRACT

A magnetic recording-reproduction apparatus records and reproduces a wide-band video signal without a color burst signal. For this purpose, a two-step phase resetting operation is conducted on the FM carrier at the front porch and the horizontal sync pulse of the video signal so as to permit those phases to coincide with reference phases. A synchronizing panel clock generator generates the first reference signal with the first FM frequency corresponding to a peak level of the horizontal sync pulse and the second reference signal with the second FM frequency corresponding to a front porch level. In this case, the reference signals are phase-synchronous with each other at the leading edge of the horizontal sync pulse, and each of the FM frequencies is set to be an integer multiple of the horizontal scanning frequency. In another arrangement, a secondary FM carrier whose frequency has been shifted to a low-band is formed by generating a frequency conversion signal synchronous with the horizontal sync pulse and combining the phase-reset FM carrier with the frequency conversion signal. Either of the above arrangements can eliminate unwanted higher harmonic wave components and transient distortions in the frequency-demodulated output, thereby improving the image quality.

6 Claims, 20 Drawing Sheets

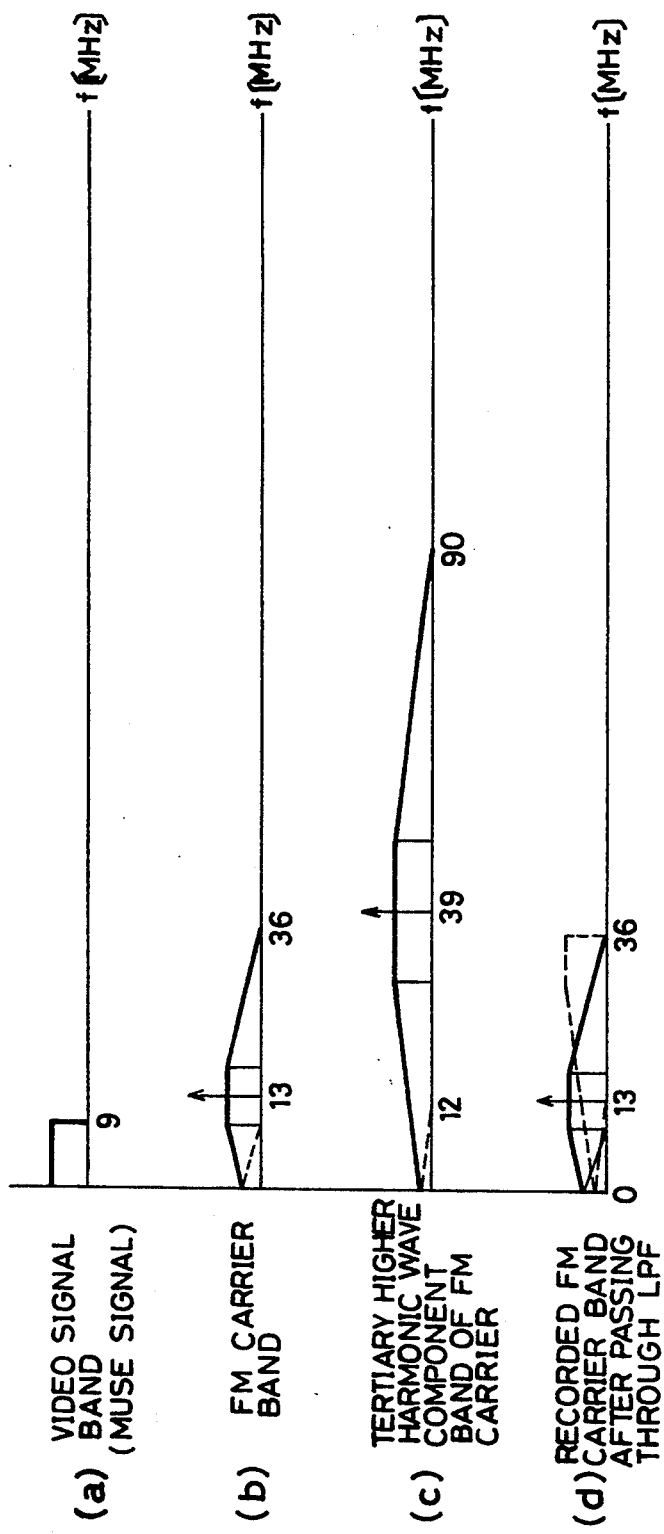

RECORDING-REPRODUCTION APPARATUS APPLYING DOUBLE RESET TO THE PHASE OF AN FM CARRIER

FIELD OF THE INVENTION

The present invention relates to a magnetic recording-reproduction apparatus for use with video signals not having a color burst signal added thereto, such as wide-frequency band signals like High-Definition Television signals and home video recording and reproducing signals. Particularly, the invention relates to a magnetic recording-reproduction apparatus wherein jitter that occurs during reproduction of the video signal can be corrected.

BACKGROUND OF THE INVENTION

Time base fluctuation of waveforms, that is, jitter, normally occurs in video signals reproduced by recording-reproduction apparatus. It is necessary to correct the jitter in order to ensure stability of the reproduced image. Now, some magnetic recording-reproduction apparatuses such as VTRs used in broadcasting, employ a direct FM recording method. According to this method, video signals are recorded and reproduced by directly modulating carrier frequency based on video signals of the NTSC color system and other system. Here, in order to correct jitter, a color burst signal inserted at each horizontal scanning cycle of the video signal serves as a reference signal and a jitter detection signal is formed based on the time base fluctuation of specified zero-cross points of the color burst signal.

Some magnetic recording-reproduction apparatuses, such as home VTRs, use the down converted chrominance component signal recording method. In this case, a color burst signal is not added to the video signal. Accordingly, normally, a jitter detection signal is produced by detecting specified portions, such as a rising edge or falling edge, of a horizontal sync signal, and jitter is corrected according to this jitter detection signal.

However, random noise gets superimposed on the horizontal sync signal and this noise lowers the accuracy of the jitter detection signal. Since this lowering in accuracy of the jitter detection signal makes sufficient correction of jitter difficult, destabilization of the reproduced image is the result.

A method for accurately detecting jitter that gets included in the reproduced signal is disclosed, for example, in the 1988 Japanese Laid-Open Publication 274290 (Tokukaihei 63-274290). This method makes use of a phenomenon that the jitter that occurs during reproduction of the video signal also causes jitter that occurs during reproduction of a carrier (referred to hereinafter as FM carrier) which is frequency-modulated according to the video signal.

In this case, the phase of the FM carrier is reset for each horizontal scanning cycle in response to the leading edge of the horizontal sync pulse included in the video signal. (This method is referred to hereinafter as the carrier reset method.) That is, during recording of the video signal, the FM carrier is recorded not with the phase completely independent of that of the video signal, but with the phase having been reset to the reference phase in response to the leading edge of the horizontal sync pulse. Further, during reproduction of the video signal, a horizontal sync pulse is demodulated from the reproduced FM carrier, and the reproduced FM carrier that has been gated by the horizontal sync pulse is used as a reference burst signal. With this arrangement, jitter can be corrected by the use of a jitter detecting signal with high accuracy that is identical to the jitter detecting signal formed from a reference burst signal in a magnetic recording-reproduction apparatus of the direct FM recording method.

However, in the above-mentioned conventional magnetic recording-reproduction apparatuses wherein the carrier resetting method is employed, since the carrier resetting operation in response to the leading edge of the horizontal sync pulse is conducted during frequency modulation, a discontinuous phase in the FM carrier occurs due to a phase shift caused by the carrier resetting operation. Here, explanation is given of the phase shift.

As shown in FIG. 14, when the above carrier resetting operation is performed with a predetermined time delay $\pi$ from the leading edge of a horizontal sync pulse, the timing of the leading edge of the horizontal sync pulse is given by $t_0'$; that of the carrier resetting, $t_0$; that of the next leading edge, $t_1'$; and that of the next carrier resetting, $t_1$. Further, the FM carrier amplitude is represented by A, and the instantaneous value of the FM carrier amplitude is represented by $F(t)$. As shown in FIG. 15, the video signal peak value that is measured on the basis of the peak level (normally set to a negative value) of the horizontal sync pulse is represented by $V_0$, while the instantaneous video signal amplitude value is represented by $V(t)$. In this case, the relationship between $F(t)$ and $V(t)$ is shown as a function of time t to form the following equation (1).

$$\begin{aligned} F(t) &= A \cdot \cos(\int 2\pi(f_{TP} + \Delta f \cdot V(t)/V_0)dt + \phi_0) \quad (1) \\ &= A \cdot \cos(2\pi f_{TP} \cdot t + \phi_0 + (2\pi \Delta f/V_0)\int' V(t)dt) \\ &= A \cdot \cos(\phi(t)) \end{aligned}$$

Here, the following equation holds:

$$\phi(t)/(2\pi) = f_{TP} + \phi_0/(2\pi) + (\Delta f/V_0)\int V(t)dt$$

where; $f_{TP}$ is the FM carrier frequency that is frequency-modulated according to the peak level of the horizontal sync pulse; and $\Delta f$ represents the frequency deviation that shows a difference between the FM carrier frequency that is frequency-modulated according to the peak value $V_0$ of the video signal and the above frequency $f_{TP}$.

Accordingly, the phase shift $\phi_1$ that is caused by the carrier resetting is indicated by the following equation (2).

$$\begin{aligned} \phi_1/(2\pi) &= (\phi(t_1) - \phi(t_0))/(2\pi) \quad (2) \\ &= f_{TP}(t_1 - t_0) + (\Delta f/V_0)\int_{t_0}^{t_1} V(t)dt \end{aligned}$$

Moreover, in the case of phase shifting, since the frequency $f_{TP}$ is given by an integer multiple of the horizontal scanning frequency $f_H$, therefore, $f_{TP}(t_1-t_0)$ becomes an integer number and can be omitted. Thus, the above-mentioned phase shift $\phi_1$ is expressed by the following equation (3).

$$\phi_1/(2\pi) = (\Delta f/V_0) \int_{t_0}^{t_1} V(t)dt \qquad (3)$$

When the carrier resetting operations are conducted during recording the FM carrier of FIG. 14 in a magnetic tape, suppose that magnetization patterns (i),(ii),-(iii), (iv),(v),(vi),(vii) or (viii) are produced as shown in FIG. 16. In FIG. 16, phase shift amounts of the FM carrier at the time of the carrier resetting are illustrated as if they varied in the order of drawings in FIG. 16; however, the video signal integral value in the above-mentioned equation (3) virtually varies at random for every horizontal scanning cycle, the phase shift amount also varies at random.

Accordingly, when the above-mentioned magnetization patterns (i) through (viii) are read out as the FM carrier and frequency demodulated, overshoots (ii)·(iii)·(iv) and undershoots (v)·(vi)·(vii)·(viii) occur at random as shown in FIG. 17 due to the discontinuous phases of the FM carrier at the time of the carrier resetting. (Here, Roman figures used in FIG. 17 correspond to those used in FIG. 16.) In the case of adopting the sync peak clamping system for clamping the video signal at peak levels of the horizontal sync pulses in order to keep the black level of the reproduced video signal, these overshoots and undershoots cause clamping errors.

On the other hand, when the carrier resetting is operated coinciding with the leading edge of the horizontal sync pulse, the above-mentioned overshoots (ii)·(iii)·(iv) and undershoots (v)·(vi)·(vii)·(viii) cause transient distortions, as shown in FIG. 18, near the leading edge of the horizontal sync pulse that has been frequency-demodulated. These transient distortions cause variations in rising time of the leading edge of the horizontal sync pulse, and thereby the phase accuracy at the leading edge of the horizontal sync pulse is adversely affected.

In this case, since the phases of the FM carrier are lined up at the trailing edge of the horizontal sync pulse, no problem is encountered in the normal operation. However, since the processing operation for correcting jitter is limited to and applied only at the trailing edge of the horizontal sync pulse, the correcting operation is delayed by a pulse width from the leading edge of the horizontal sync pulse to the trailing edge thereof. Further, the transient distortions cause variations in the horizontal sync pulse width, and thereby the correlation between the leading edge of the horizontal sync pulse and the trailing edge thereof is adversely affected.

As described above, in the conventional magnetic recording-reproduction apparatus which conducts the carrier resetting operation, jitter can be corrected with high accuracy by obtaining the reference burst signal from the reproduced FM carrier. However, since a discontinuous phase shift occurs in the FM carrier upon the carrier resetting operation, a problem is encountered in that transient distortions such as overshoots and undershoots are caused in the horizontal sync pulse that has been frequency-demodulated.

In the 1989 Japanese Laid-Open Publication 264492 (Tokukaisho 1-264492), a magnetic recording-reproduction apparatus is disclosed. This device has a recording system which, as shown in FIG. 19, inserts a phase compensation pulse into the front porch of the video signal in order to prevent transient distortion of a horizontal sync pulse section due to carrier reset. In other words, as shown in FIG. 20, the recording system of this magnetic recording-reproduction apparatus:

(a) detects the phase of the FM carrier corresponding to the front porch of the video signal from the frequency modulator;

(b) produces a phase compensation pulse which corresponds to the detected phase, the height of the pulse being preliminarily estimated; and (c) enters the phase compensation pulse into the frequency modulator and inserts it into the front porch of the video signal.

The frequency of the FM carrier (referred to hereinafter as FM frequency) is corrected according to this phase compensation pulse. As a result, discontinuity of the phase of the FM carrier is reduced.

However, in this magnetic recording-reproduction apparatus, high-speed feedback becomes necessary since the insertion of the phase compensation pulse is carried out immediately after the detection of the phase of the FM carrier corresponding to the front porch of the video signal. As a result, a sophisticated and expensive circuit configuration becomes necessary. Further, in this magnetic recording-reproduction apparatus, since the phase of the FM carrier varies freely at the front porch for each horizontal scanning period, the pulse height of the the phase compensation pulse before horizontal scanning cannot be estimated by the use of the phase of the FM carrier. Consequently, it becomes difficult to achieve a phase compensation pulse having a pulse height which sufficiently eliminates phase distortion.

A method is known according to which a high-frequency carrier is frequency-modulated based on the video signal, thereby producing a primary FM carrier. Then, a center frequency of the primary FM carrier is shifted to a low frequency, and a low-frequency FM carrier (secondary FM carrier) produced according to this shift is recorded. Conventionally, the frequency of the frequency-modulated carrier is up to 15 MHz. This method has the advantage over the method wherein the low-frequency carrier is directly frequency-modulated and recorded, in that unwanted higher harmonic wave components do not get included easily, and in that linearity is also good. This method is particularly effective when frequency modulation of high-frequency carriers is carried out based on wide-band video signals such as High-Definition Television signals.

However, a disadvantage exists in that, during frequency modulation even if the carrier reset is applied to the primary FM carrier, the phase shifts simultaneously with the shifting of the frequency to the low-frequency band. As a result, the phase of the secondary FM carrier no longer remains synchronous with the horizontal sync pulse.

On the other hand, in the method wherein the carrier of the low-frequency is frequency-modulated directly, unwanted higher harmonic wave components get included in the FM carrier and the problems to be described later arise.

For example, a frequency demodulator in a video tape recorder (referred to hereinafter as VTR) as shown in FIG. 21 has a delay line driver 201, a full wave rectification circuit 202 and a delay line 204 connected respectively to outputs of the delay line driver 201, and a low-pass filter (LPF) 203 connected to the output of the full wave rectification circuit 202. The termination of the delay line 204 is short-circuited.

Now, consider an ideal case, as shown in FIG. 22(b), of an FM carrier being recorded and reproduced in which no unwanted higher harmonic wave components get included, the FM carrier being based on a video signal having a waveform as shown in FIG. 22(a). The reproduced FM carrier is formed into a square wave on passing through a high gain limiter circuit or the like and then is supplied to the delay line driver 201. The delay line 204 delays and reflects the square wave. Then, a composite wave, consisting of the square wave and the delayed and reflected square wave, is supplied to the full wave rectification circuit 202. Accordingly, a pulse signal whose leading edge is synchronous with the zero-cross points of the FM carrier is supplied from the full wave rectification circuit 202 to the LPF 203, as shown in FIG. 22(c). The carrier wave component of the pulse signal is eliminated by the LPF 203, and an ideal video signal with no distortion is demodulated, as shown in FIG. 22(d).

As against this, in the case where a low-frequency carrier is directly frequency-modulated, as shown in FIG. 22(e), the reproduced FM carrier becomes a square wave because unwanted higher harmonic wave components get included. Moreover, since the frequency of the reproduced FM carrier shifts due to superimposition of the higher harmonic wave components, the rising edge of the square wave shown in FIG. 22(e) is no longer synchronous with the zero-cross points of the ideal FM carrier shown in FIG. 22(b). As shown in FIG. 22(f), a pulse signal is supplied to the LPF 203 from the full wave rectification circuit 202. The pulse signal is synchronous with the zero-cross points of the deviated FM carrier which includes the higher harmonic wave components. As a result, distortion occurs in the video signal demodulated after the elimination of the carrier wave component of the pulse signal by the LPF 203, as shown in FIG. 22(g). Consequently, a problem occurs in that moiré increases.

Moreover, among the higher harmonic wave components which get included in the reproduced FM carrier, the tertiary higher harmonic wave component is the main cause of distortion in the demodulated signal (the tertiary higher harmonic wave component is a spectrum component of the reproduced FM carrier and its center frequency and modulation index are three times the center frequency and modulation index of the reproduced FM carrier). An explanation follows regarding this tertiary higher harmonic wave component, using specific values.

Suppose that a carrier having a 13 MHz grey level frequency, shown in FIG. 23(b), has been frequency-modulated based on a MUSE signal, shown in FIG. 23(a), having a 9 MHz frequency band. The deviation after frequency modulation is assumed to be ±3.5 MHz and the degree of pre-emphasis on the MUSE signal is regarded to be 12 dB (approximately 4 times). If the frequency band of the FM carrier is 2×(deviation + frequency band of the video signal), in the present case, the upper-limit value (shown in FIG. 23(b)) of the frequency band of the FM carrier is $$13+(3.5\times4+9)=36 \text{ [MHz]} \tag{1}$$

Further, the center frequency (shown in FIG. 23(c)) of the tertiary higher harmonic wave component is $$13\times3=39 \text{ [MHz]}$$

The upper-limit value (shown in FIG. 23(c)) and the low-limit value (not shown) respectively are $$13\times3+(3.5\times4\times3+9)=90 \text{ [MHz]}$$

$$13\times3-(3.5\times4\times3+9)=-12 \text{ [MHz]} \tag{2}$$

(broken lines in FIGS. 23(b) and (c) show the respective negative folding components).

As will be clear on comparing (1) and (2) above and referring to FIGS. 23(b) and (c), in the case where the frequency of the carrier is low, the tertiary harmonic wave component enters the transmission band of the FM carrier, and as a result cannot be isolated even by the LPF 203. FIG. 23(d) shows the frequency band of the FM carrier which should be recorded after the high-frequency band cut by the LPF 203; the broken line shows the unwanted tertiary higher harmonic wave component in the transmission band of the FM carrier.

Consequently, since the unwanted tertiary higher harmonic wave component and the negative folded higher harmonic wave components adversely affect frequency demodulation, the distortion of the demodulated video signal increases, as does moiré. Furthermore, in the case where the distortion of the video signal is large, demodulation can become impossible. Similar problems occur in pulse-counter type frequency modulators used in conventional VTRs as well.

SUMMARY OF THE INVENTION

It is the first object of the present invention to provide a magnetic recording-reproduction apparatus which is suitable for recording and reproducing a video signal not having a reference burst signal added thereto.

It is the second object of the present invention to provide a magnetic recording-reproduction apparatus wherein, in the case of resetting the phase of an FM carrier at a specific portion of a horizontal sync pulse contained in the video signal, the occurrence of transient distortions in the horizontal sync pulse after having been demodulated can be substantially eliminated by providing a simple circuit configuration.

It is the third object of the present invention to provide a magnetic recording-reproduction apparatus wherein a secondary FM carrier having a low frequency is obtained by frequency-conversing a primary FM carrier whose phase is kept synchronous with that of a horizontal sync pulse and thereby, recording and reproducing of the video signal are executed according to the secondary FM carrier.

It is the fourth object of the present invention to provide a magnetic recording-reproduction apparatus wherein a secondary FM carrier not having unwanted higher harmonic wave components can be obtained.

In order to achieve the above first and second objects, the magnetic recording-reproduction apparatus of the present invention is characterized in comprising the following means:

(1) frequency modulating means, including a carrier oscillator for generating a carrier (for example, an FM oscillator constituted by flip-flop circuits), which modulates a frequency of the carrier according to the amplitude of a video signal including a front porch and a horizontal sync pulse so as to generate an FM carrier.

(2) pulse signal generating means (for example, a synchronizing panel clock generator) for generating a master clock signal, a first reference pulse signal and a second reference pulse signal, the first reference pulse signal having a first reference frequency corresponding to a peak level of the horizontal sync pulse, the second reference pulse signal having a second reference frequency corresponding to a level of the front porch, the first reference frequency and the second reference frequency being phase-synchronous with each other at a leading edge of the horizontal sync pulse, and each of the first and second reference frequencies being set to an integer multiple of the horizontal scanning frequency; and (3) carrier resetting means (for example, a gate circuit and a reset pulse composition circuit) for conducting a two-step carrier resetting operation on the FM carrier for each horizontal scanning cycle in such a manner that the phase of the FM carrier is permitted to coincide with the phase of the second reference pulse signal at the front porch and is also permitted to coincide with the phase of the first reference pulse signal at the leading edge of the horizontal sync pulse.

In the above arrangement, the video signal is recorded according to the reset FM carrier having been thus carrier-reset. On the other hand, when the video signal is reproduced, a portion of the reproduced FM carrier having the first reference frequency is extracted as a reference burst signal which is required for generating a jitter detection signal.

Further, by the use of the automatic frequency control, the frequency of the FM carrier is stabilized by comparing it with the first reference frequency or the second reference frequency.

With the above arrangement, a two-step resetting operation is conducted on the phase of the FM carrier at the front porch and the leading edge of the horizontal sync pulse. A first reference pulse signal and a second reference pulse signal, which are used as a basis for the phase to be reset, are directed from the same master oscillator such that they are respectively phase-synchronous with the leading edge of the horizontal sync pulse. Each of the first and second reference frequencies is set to an integer multiple of the horizontal scanning frequency.

As a result, the phase of the reset FM carrier corresponding to the front porch is continuously connected to the phase of the reset FM carrier corresponding to the horizontal sync pulse. Thus, transient distortions caused by the carrier resetting operation can be eliminated from the horizontal sync pulse of the reproduced video signal. This prevents errors from occurring in clamping the video signal at the peak level of the horizontal sync pulse and also prevents errors from occurring in detecting the leading edge of the horizontal sync pulse.

In order to achieve the third and the fourth objects, the magnetic recording-reproducing apparatus in accordance with the present invention is characterized in including at least the following means:

(1) frequency modulating means (for example, a FM circuit with an external reset function) including a carrier oscillator for generating a carrier having a first frequency, for frequency-modulating the carrier based on an amplitude of a video signal including a horizontal sync pulse, and for producing a primary FM carrier;

(2) carrier resetting means (for example, a FM circuit with an external reset function and a carrier reset pulse generation circuit) for producing a pulse signal whose phase is synchronous with the horizontal sync signal, and for resetting the phase of the primary FM carrier at each horizontal scanning cycle so as to correspond to a specified portion of the horizontal sync pulse by supplying the pulse signal to the frequency modulating means;

(3) reference signal generating means (such as a clock generation circuit) for producing a frequency conversion signal having a first reference frequency, the phase thereof being synchronous with the horizontal sync pulse;

(4) frequency conversing means (such as a frequency shifting circuit) for producing a composite signal by compositing the primary FM carrier whose phase has been reset by the carrier resetting means and the frequency conversion signal; and (5) low-pass filtering means (such as a low-pass filter) for drawing out only a difference component as a secondary FM carrier from the composite signal, the center frequency of the secondary FM carrier being set in a second frequency, the center frequency of the primary FM carrier being converted to a lower frequency band of the second frequency.

In the above configuration, the first frequency and the second frequency are set so that a lower limit of a frequency band of a sum component of the signals synthesized by the frequency conversion means is greater than an upper limit of a frequency band of the difference component, whereby recording of the video signal is conducted according to the secondary FM carrier. On the other hand, when reproducing the video signal, a portion of the reproduced primary FM carrier that has a frequency corresponding to a peak level of the horizontal sync pulse is extracted as a reference burst signal that is used for correcting jitter during reproduction of the video signal. Here, the portion of the reproduced primary FM carrier is phase-synchronous with a specified portion of the horizontal sync pulse.

The magnetic recording-reproduction apparatus in accordance with the present invention is arranged such that a frequency of a specified portion of the secondary FM carrier is compared with an AFC reference frequency signal produced by the reference signal generating means for each horizontal scanning cycle and also that a carrier generated by frequency converting means has a stable first frequency. As a result, the first frequency is no longer adversely affected by temperature drift etc. of the frequency modulating means and the frequency converting means.

According to the above-mentioned arrangement, the frequency modulating means generates a carrier having a first frequency (for example, several times higher that the frequency of the conventional carrier), frequency-modulates the carrier based on a video signal, and produces a primary FM carrier. Moreover, it is desirable that a DC voltage level of this video signal be corrected to a fixed value and that the video signal be pre-emphasized.

The carrier resetting means produces a pulse signal which is phase-synchronous with a horizontal sync pulse included in the video signal, and resets the phase of the primary FM carrier for each horizontal scanning period so as to correspond to a specified portion of the horizontal sync pulse by supplying the pulse signal to the frequency modulating means. Moreover, the specified portion of the horizontal sync pulse may equally be a leading edge of the horizontal sync pulse or a specified portion of the horizontal sync pulse corresponding to the convergence of the frequency shift of the FM carrier due to pre-emphasis.

The reference signal generating means produces a frequency conversion signal having a first reference frequency, the phase thereof being synchronous with the horizontal sync signal. This is an essential characteristic of the present invention.

The frequency conversion means synthesizes the primary FM carrier entered from the frequency modulating means and the frequency conversion signal entered from the reference signal generating means.

The low-pass filtering means extracts only a difference component from the signal that has been synthesized by the frequency conversion means, and produces a secondary FM carrier whose center frequency is set to a second frequency, that is, a frequency obtained by converting the center frequency of the primary FM carrier to a lower frequency band.

Here, the first frequency and the second frequency are set so that a lower limit of a frequency band of a sum component of the signals synthesized by the frequency conversion means is greater than an upper limit of a frequency band of the difference component.

Since the phase of the primary FM carrier and the phase of the frequency conversion signal are synchronous with the horizontal sync pulse, the phase of the secondary FM carrier is also synchronous with the horizontal sync pulse. This is explained below.

Let $t_R$ be the time taken for carrier reset. The primary FM carrier $C(t)$ in time $t_R$ may be expressed by the following sinusoidal wave:

$$C(t_R) = \sin(\omega_c t_R + m_f \times v(t_R)) \quad (3)$$

where, in the above equation, $\omega_c$: the center angular frequency of the primary FM carrier $m_f$: modulation index $v(t_R)$: the value $v(t) = \int v^*(t)dt$ (the integration constant being 0) at time $t_R$ of a function of a video signal $v^*(t)$ integrated over time t.

Further, the phase shift between the primary FM carrier and the horizontal sync pulse at time $t_R$ is regarded to be 0 [rad] due to carrier reset.

The frequency conversion signal $S(t)$ is similarly considered to be a sinusoidal wave, and is expressed by the following equation at time $t_R$:

$$S(t_R) = \sin(\omega_{sh} t_R + \phi) \quad (4)$$

where, in the above equation, $\omega_{sh}$: angular frequency of the frequency conversion signal $\phi$: the phase shift between the frequency conversion signal and the horizontal sync pulse at time $t_R$.

Here, the primary FM carrier $C_5(t)$ including the tertiary higher harmonic wave component is expressed by the following equation:

$$C_3(t) = \sin(\omega_c t + m_f v(t)) + k \cdot \sin\{3 \times (\omega_c t + m_f v(t))\}$$

In the above equation, the symbol k is the amplitude coefficient of the tertiary higher harmonic wave component.

From equations (3) and (4), an FM carrier $C_s(t)$, i.e., a composite signal of the primary FM carrier and the frequency conversion signal, at time $t_R$ is expressed as follows:

$$C_s(t_R) = \sin\{(\omega_c t_R + m_f \times v(t_R)) - (\omega_{sh} t_R + \phi)\} +$$

-continued
$$\sin\{(\omega_c t_R + m_f \times v(t_R)) + (\omega_{sh} t_R + \phi)\}$$

The low-pass filtering means draws out only a difference component of the synthesized FM carrier Cs(t) and releases it as a secondary FM carrier. As a result, the secondary FM carrier $C_2(t_R)$ becomes:

$$\begin{aligned} S_2(t_R) &= \sin\{(\omega_c t_R + m_f \times v(t_R)) - (\omega_{sh} t_R + \phi)\} \quad (5) \\ &= \sin\{(\omega_c - \omega_{sh})t_R + m_f \times v(t_R) - \phi\} \end{aligned}$$

With the phase shift $\phi$ constant, if it is set, for example, to be 0 [rad], from equation (5), the phase shift between the secondary FM carrier and the horizontal sync pulse also becomes 0 [rad]. Thus, even when frequency conversion is carried out, the phase shift between the secondary FM carrier and the horizontal sync pulse becomes 0 [rad] for each horizontal scanning period.

Furthermore, since the first frequency of the carrier generated by the carrier oscillator of the frequency modulating means and the second frequency, which is the center frequency of the secondary FM carrier, are set so that a lower limit of a frequency band of a sum component of the signals synthesized by the frequency conversion means is greater than an upper limit of a frequency band of the difference component, it becomes possible to isolate a secondary FM carrier having only a few unwanted components. As a result, a highly accurate jitter detection signal can be achieved by using, as a reference burst signal, an FM carrier gated according to the horizontal sync signal demodulated from the reproduced FM carrier.

Moreover, since the secondary FM carrier has only a few unwanted components, the accuracy of the demodulation increases, thereby improving picture quality. Further, since in the carrier reset method it becomes unnecessary to insert the burst signal for jitter detection into the video signal, there is an advantage in that the blanking time of the video signal can be shortened.

For a fuller understanding of the nature and advantages of the invention, reference should be made to the ensuring detailed description taken in conjunction with the accompanying drawings.

BRIEF DESCRIPTION OF THE DRAWINGS

FIGS. 14 through 23 show the prior art.

FIG. 14 is a wave-form drawing showing how the phase of an FM carrier is reset.

FIG. 15 is an explanatory drawing showing frequency allocations of an FM carrier.

FIG. 16 is an explanatory drawing showing magnetization patterns in the case of recording an FM carrier whose phase has been reset on a magnetic tape.

FIG. 17 is an explanatory drawing showing transient distortions that are caused by carrier resetting operations in a reproduced horizontal sync pulse.

FIG. 18 is an explanatory drawing showing transient distortions that are caused by carrier resetting operations conducted on the leading edge of the reproduced horizontal sync pulse.

FIG. 19 is a wave-form drawing showing a video signal wherein a phase adjusting pulse for correcting the transient distortions is inserted into a front porch thereof.

FIG. 20 is a block diagram showing the arrangement of a recording system for generating and recording the video signal of FIG. 19.

FIG. 21 is a block diagram showing the arrangement of a frequency demodulator provided in the conventional VTR, wherein delay lines are employed.

FIGS. 22(a) through 22(g) are wave-form drawings, each explaining an operation of the frequency demodulator that is conducted on each of FM carriers having an optimal FM carrier or an FM carrier containing unwanted higher harmonic components.

FIGS. 23(a) through 23(d) are explanatory drawings showing frequency bands of signals that are released and entered between respective parts of the conventional frequency modulator wherein the frequency of the FM carrier is not converted into a low-band.

DESCRIPTION OF THE EMBODIMENTS

[EMBODIMENT 1]

Referring to FIG. 1 to FIG. 6, the following will describe one preferred embodiment of the present invention.

Figure 1:
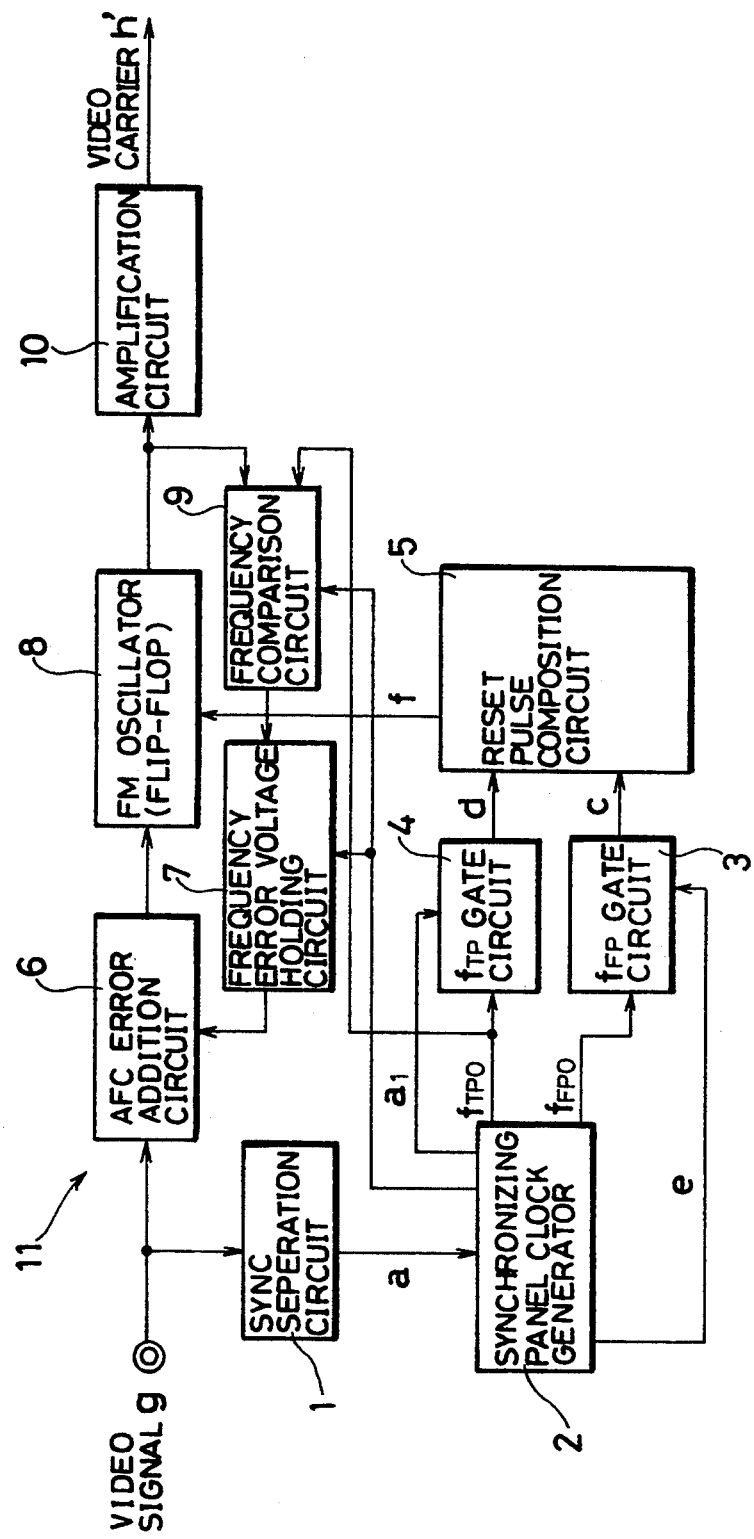
FIG. 1 is a block diagram showing one structural example of a frequency modulation circuit of the present invention.
Figure 2:
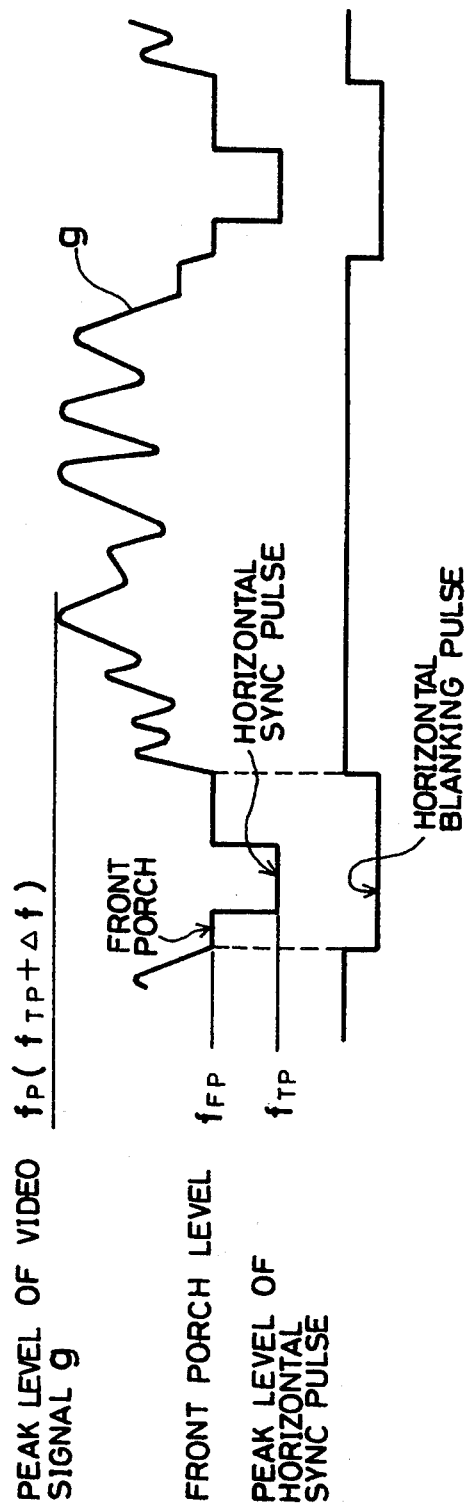
FIG. 2 is an explanatory drawing showing frequency allocations of an FM carrier.

As illustrated in FIG. 2., a magnetic recording-reproduction apparatus of this embodiment records a video signal g which includes the front porch and a horizontal sync pulse having the negative peak level by using frequency modulation. A carrier which is frequency-modulated according to the video signal g is hereinafter termed the FM carrier. As shown in FIG. 1, the device is provided with a frequency modulation circuit 11 for resetting the carrier twice, once at the front porch and the other at the leading edge of the horizontal sync pulse. This two-step carrier resetting operation is hereinafter referred to as a double reset.

The frequency modulation circuit 11 includes a sync separation circuit 1 to which the video signal g is entered. The sync separation circuit 1 separates a horizontal sync pulse signal a (see FIG. 3(a)) from the video signal g and then releases it. A synchronizing panel clock generator 2 is connected to the output of the sync separation circuit 1 and is provided with a master oscillator (not shown). The master oscillator generates a first reference frequency signal (hereinafter termed the first REF signal) $f_{TPO}$ (see FIG. 3(b)) and a second reference frequency signal (the second REF signal) $f_{FPO}$ (see FIG. 3(c)) having a second reference frequency that corresponds to the color-difference pedestal level. The respective reference frequencies of the first REF signal $f_{TPO}$ and the second REF signal $f_{FPO}$ are set at integer multiples of a horizontal scanning frequency $f_H$. Moreover, the present invention significantly arranges that the REF signals $f_{TPO}$ and $f_{FPO}$ become phase-synchronous with each other at the leading edge of the horizontal sync pulse.

In addition to the transmission of the REF signals, $f_{TPO}$ and $f_{FPO}$, the synchronizing panel clock generator 2 transmits processing pulse signals necessary for carrying out the double reset, including a horizontal new sync pulse signal $a_1$, a horizontal blanking pulse signal b (see FIG. 3(d)), a front porch pulse signal e (see FIG. 3(e)) indicating the front porch of the video signal, and various gate pulse signals. The horizontal new sync pulse signal $a_1$ is synchronous with the horizontal sync pulse signal a. The front porch pulse signal e is produced according to the trailing edge of the horizontal blanking pulse signal b and the trailing edge of the horizontal sync pulse signal a.

The outputs of the synchronizing panel clock generator 2 are connected to a frequency error voltage holding circuit 7, a frequency comparison circuit 9, an $f_{FP}$ gate circuit 3, and an $f_{TP}$ gate circuit 4, respectively. The second REF signal $f_{FPO}$ and the front porch pulse signal e are entered into the $f_{FP}$ gate circuit 3. Meanwhile, the horizontal new sync pulse signal $a_1$ is entered into the frequency error voltage holding circuit 7, frequency comparison circuit 9 and $f_{TP}$ gate circuit 4, respectively. Further, the first REF signal $f_{TPO}$ is entered into the $f_{TP}$ gate circuit 4.

The $f_{FP}$ gate circuit 3 is connected to a reset pulse composition circuit 5, and transmits the second REF signal $f_{FPO}$ as a front-porch carrier reset pulse signal (hereinafter referred to as FP carrier reset signal) c to the reset pulse composition circuit 5 for a period of time when the front porch pulse signal e is entered thereto. The output of the $f_{TP}$ gate circuit 4 is also connected to the reset pulse composition circuit 5, and the first REF signal $f_{TPO}$ is transmitted as a sync tip carrier reset pulse signal (referred to as TP carrier reset signal) d to the reset pulse composition circuit 5. The leading edge of the TP carrier reset signal d is synchronous with that of the first REF signal $f_{TPO}$.

The output of the reset pulse composition circuit 5 is connected to an FM oscillator 8 formed by a flip-flop, and a double reset pulse f, which is composited by the FP carrier reset pulse signal c and the TP carrier reset pulse signal d, is transmitted from the reset pulse composition circuit 5 to the FM oscillator 8.

The input of the FM oscillator 8 is connected to an AFC error addition circuit 6, while the outputs thereof are connected to an amplification circuit 10 and the frequency comparison circuit 9. The FM oscillator 8 generates a carrier in phase-synchronism with the input double reset signal f entered thereto.

Next, an automatic frequency control (AFC) circuit for stabilizing the frequency of the carrier will be explained below. The AFC circuit is composed of the AFC error addition circuit 6, FM oscillator 8, frequency comparison circuit 9 and frequency error voltage holding circuit 7. The frequency comparison circuit 9 compares an FM frequency corresponding to the peak level of the horizontal sync pulse and the first reference frequency of the first REF signal $f_{TPO}$ in order to produce a correction voltage that is a function of the result of the comparison. This comparing operation is conducted for each horizontal scanning cycle. The frequency error voltage holding circuit 7 holds the correction voltage for one horizontal scanning period and feeds the correction voltage back to the AFC error addition circuit 6 during the next horizontal scanning period. The AFC error addition circuit 6 adds the correction voltage to the video signal g. As a result, the modulated frequency of the FM carrier transmitted by the FM oscillator 8, which corresponds to the peak level of the horizontal sync pulse, is stabilized.

With the above configuration, the FM carrier to be recorded and reproduced by the magnetic recording-reproduction apparatus has three frequencies, $f_{TP}$, $f_{FP}$, and fp, specified by the video signal g as illustrated by the frequency allocation in FIG. 2. Namely, $f_{TP}$, $f_{FP}$ and fp correspond to the peak level of the horizontal sync pulse included in the video signal g, the front porch, and the peak level of the video signal g, respectively. The relation between $f_{TP}$ and fp is $fp=(f_{TP}+\Delta f)$. The leading edge of the horizontal blanking pulse b precedes that the horizontal sync pulse signal a by a period corresponding to the front porch.

During recording, the video signal g is entered into the frequency modulation circuit 11 shown in FIG. 1. First, the sync separation circuit 1 separates the horizontal sync pulse signal a from the video signal g. Next, the synchronizing panel clock generator 2 produces a horizontal new sync pulse signal $a_1$ in phase-synchronism with the horizontal sync pulse signal a, and the front porch pulse signal e. The synchronizing panel clock generator 2 transmits the horizontal new sync pulse signal $a_1$ to the frequency error voltage holding circuit 7, frequency comparison circuit 9 and $f_{TP}$ gate circuit 4, and transmits the front porch pulse signal e to the $f_{FP}$ gate circuit 3.

The $f_{FP}$ gate circuit 3 uses the front porch pulse signal e as a gate signal, and transmits the second REF signal $f_{FPO}$ generated by the synchronizing panel clock generator 2 to the reset pulse composition circuit 5 for a period of time corresponding to the front porch. The second REF signal $f_{FPO}$ transmitted to the reset pulse composition circuit 5 is the FP carrier reset signal c that resets the phase of the FM carrier at the front porch.

Meanwhile, the $f_{TP}$ gate circuit 4 uses the horizontal new sync pulse signal $a_1$ as a gate signal, and receives the first REF signal $f_{TPO}$ from the synchronizing panel clock generator 2 for a period corresponding to a pulse width of the horizontal new sync pulse signal $a_1$. Then, the $f_{TP}$ gate circuit 4 generates the TP carrier reset signal d by using the first REF signal $f_{TPO}$. The TP carrier reset signal d is set to have an optimum number of pulses for resetting the FM carrier h whose phase has not been reset.

The reset pulse composition circuit 5 composites the FP carrier reset signal c and the TP carrier reset signal d to produce the double reset signal f that enables accurate carrier resetting.

Figure 3:
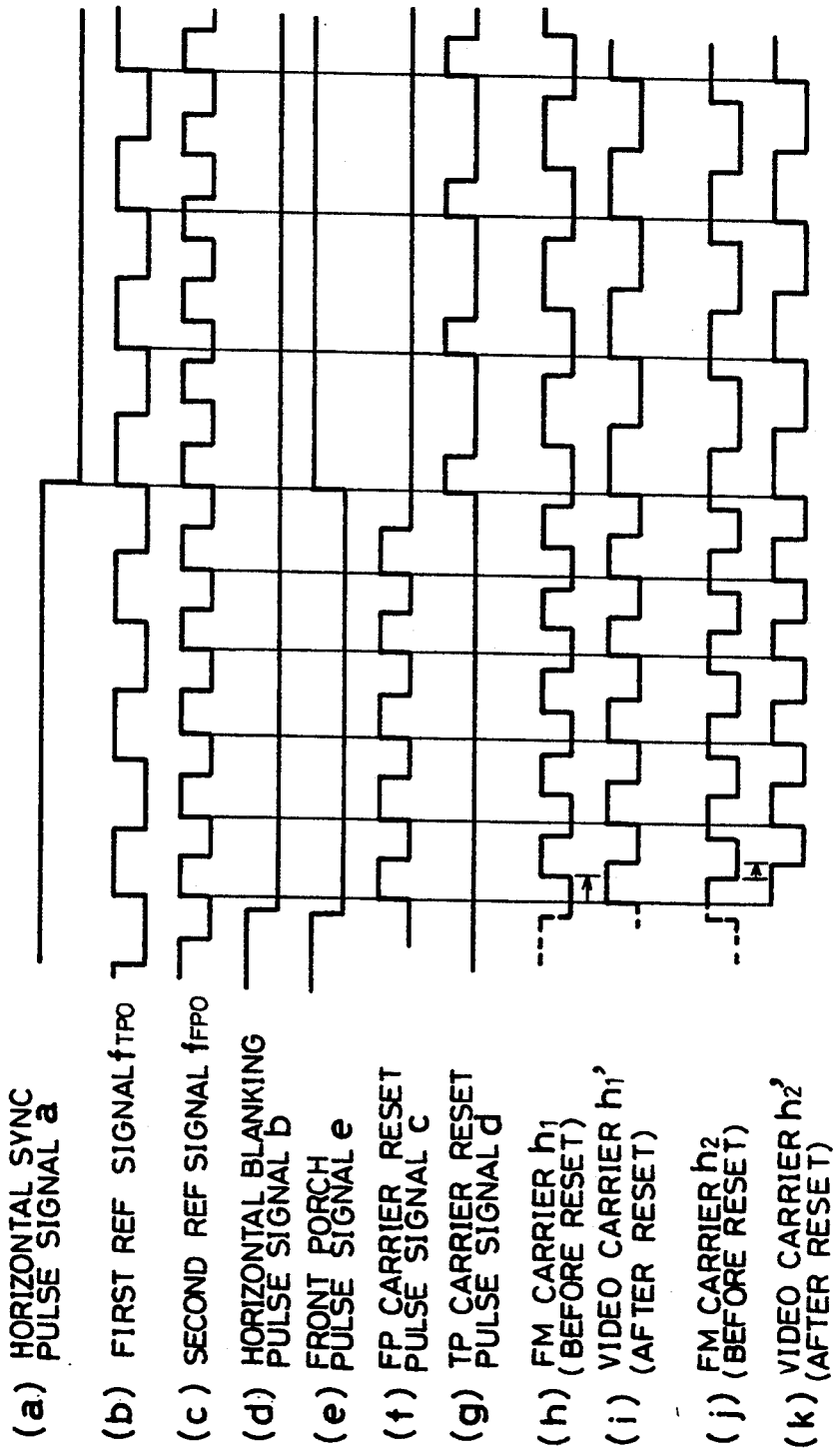
FIGS. 3(a) through 3(k) are timing charts showing signals that are released and entered between respective parts of the frequency modulation circuit of FIG. 1.

After generating an FM carrier h, whose frequency corresponding to the peak level of the horizontal sync pulse is stabilized by the AFC circuit, the FM oscillator 8 causes the FM carrier h to be phase-synchronous with the double reset signal f. The double resetting operation is illustrated in FIG. 3, (h) and (i) or (j) and (k). A video carrier h' which has thus undergone the double reset is transmitted via the amplification circuit 10 to a recording system in a later stage so that it is recorded on a magnetic tape (not shown).

The stabilization of the oscillation frequency by the AFC circuit may be carried out by comparing the frequency $f_{FP}$ corresponding to the front porch and the second reference frequency of the second REF signal $f_{TPO}$.

In the present invention, it is arranged that the respective reference frequencies of the first REF signal $f_{TPO}$ and the second REF signal $f_{FPO}$ are set at integer multiples of the horizontal scanning frequency $f_H$ and become phase-synchronous with each other at the leading edge of the horizontal sync pulse. Consequently, the video carrier h' carrier-reset at the front porch and the video carrier h' carrier-reset at the leading edge of the horizontal sync pulse are phase-synchronous with each other at the leading edge of the horizontal sync pulse. In another word, the phase of the video carrier h' is continuous. In the case when a carrier is reset at a specific portion of the horizontal sync pulse with a conventional device, one problem arises, i.e. the phase of the video carrier is interrupted. The double reset system of the present invention overcomes such a problem.

Figure 4:
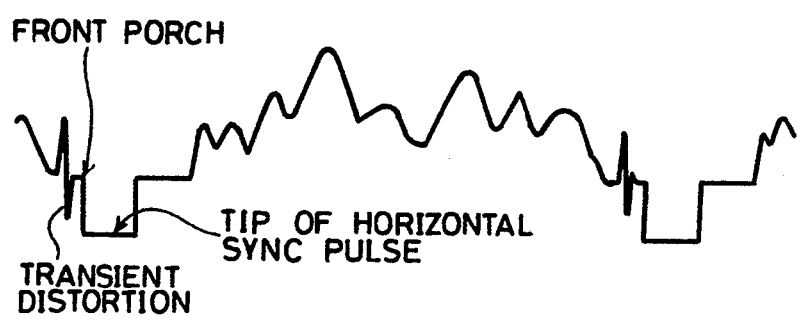
FIG. 4 is a wave-form drawing showing a reproduced video signal.

With this system, however, since the carrier is reset at the front porch, the phase of the video carrier h' is interrupted at the front porch. Therefore, when the video carrier h' is reproduced, there appears a carrier-phase discontinuous portion in the front porch of the reproduced video carrier. As a result, as illustrated in FIG. 4, transient distortion occurs in the front porch of the frequency-demodulated output. On the contrary, since the phase of the video carrier h' corresponding to the leading edge of the horizontal sync pulse varies continuously, transient distortion does not occur in the horizontal sync pulse of the frequency-demodulated output. This prevents a clamp error from occurring even in a magnetic recording-reproduction apparatus that employs the above-mentioned sync peak clamping system.

Figure 5:
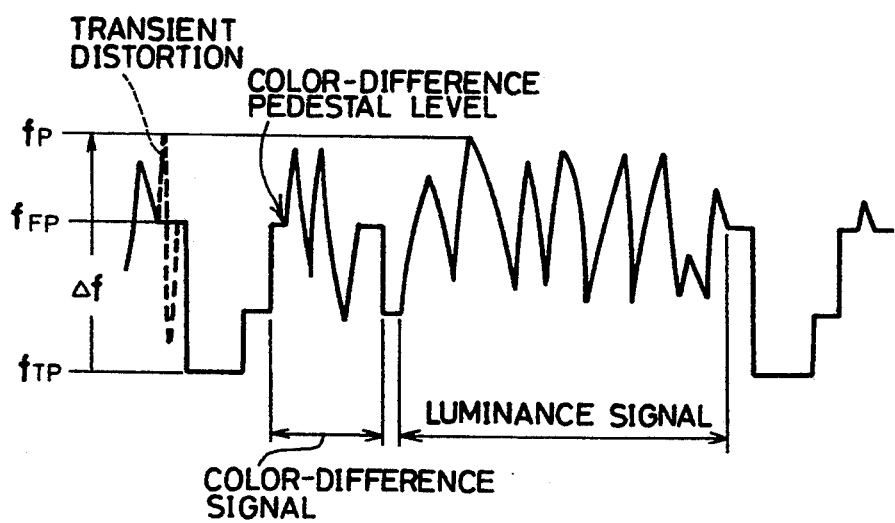
FIG. 5 is an explanatory drawing showing other frequency allocations of a FM carrier.
Figure 6:
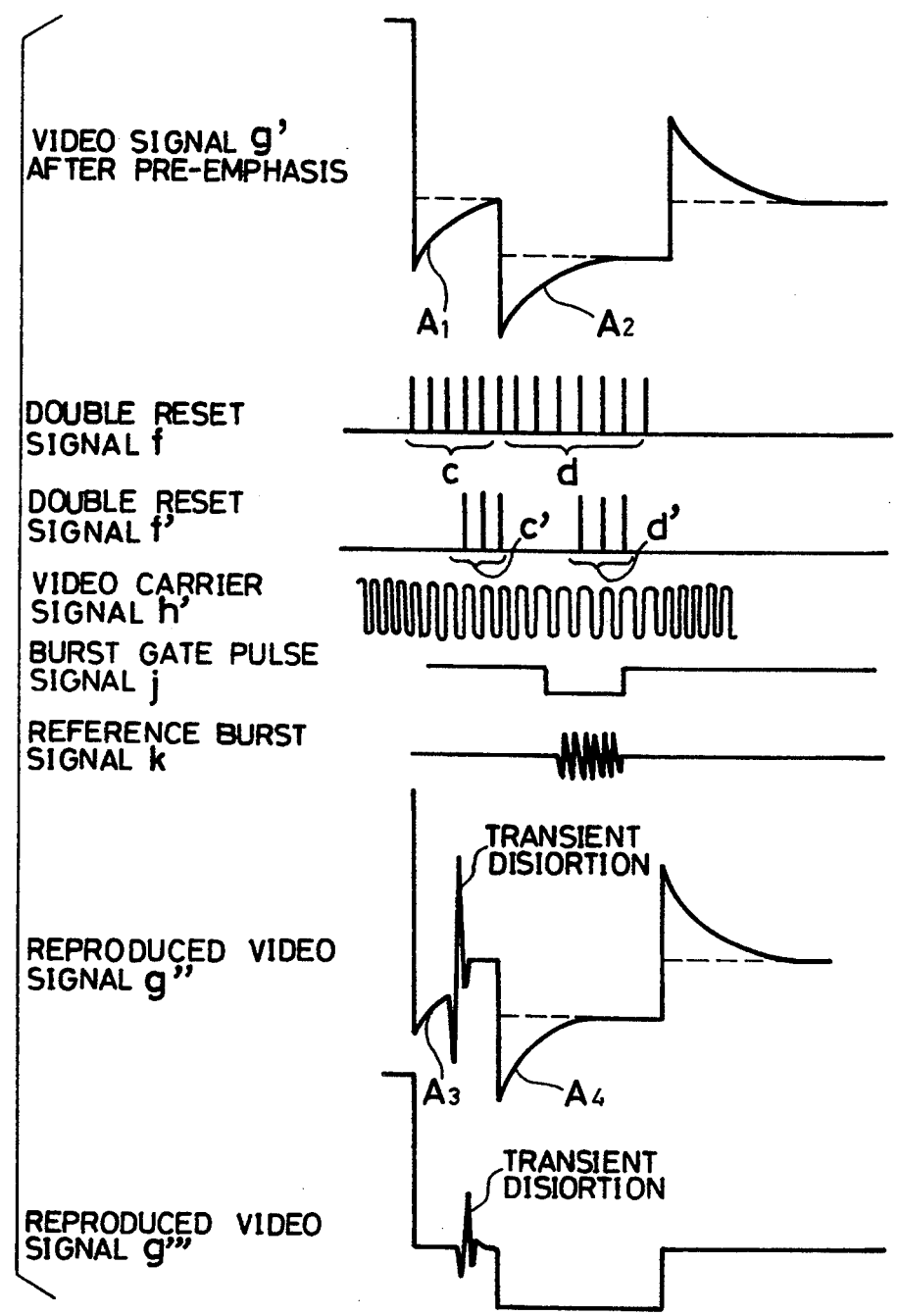
FIGS. 6(a) through 6(h), which show another embodiment of the present invention, are wave-form drawings explaining a carrier resetting operation conducted on a video signal that has been subjected to pre-emphasis operation.

The front porch may also be set at the color difference pedestal level. In the case of a TCI (Time-Compressed Integration) signal, as illustrated in FIG. 5, the color difference pedestal level is set at the center level (50%) of the video signal. With this arrangement, undershoot in the negative direction, which occurs at the front porch, does not reach the peak level of the horizontal sync pulse. This prevents the horizontal sync separation circuit from erroneously viewing the transient distortion noise as the leading edge of the horizontal pulse.

Additionally, the carrier resetting operation is executed by the double reset signal f (see FIG. 6) composed of successive FP carrier reset signal c and the TP carrier reset signal d. This system is suitable for recording of the video signal g to which the pre-emphasis has not been applied. Furthermore, the following second embodiment will explain a carrier resetting system that is suitable for the recording and reproduction of the video signal g' to which the pre-emphasis has already been applied.

[EMBODIMENT 2]

As illustrated in FIG. 6(a), in a video signal g' to which pre-emphasis has been applied, sags $A_1$ and $A_2$ occur at the front portion of the front porch and the front portion of the horizontal sync pulse. At these portions, the FM frequency shifts. Therefore, if a double reset is performed with the continuous FM carrier reset signal f described in Embodiment 1, a phase deviation occurs. Consequently, at the time the frequency shifts caused by the sags $A_1$ and $A_2$ are respectively converged into predetermined values, an FP carrier reset signal c' is produced as the second reset pulse signal and TP carrier reset signal d' is produced as the first reset pulse signal so that a double reset signal f' (see FIG. 6(c)) is formed by compositing these two signals. The FM carrier is carrier-reset with the double reset signal f' so as to record a video carrier signal h' (see FIG. 6(d)).

During the reproduction of the video carrier signal h', as with the first embodiment, a horizontal sync pulse signal is separated from the output of the frequency demodulator by the sync separation circuit. A synchronizing panel clock generator generates a burst gate pulse signal j (see FIG. 6(e)) in correlation with the latter half of the horizontal sync pulse by using the horizontal sync pulse signal. A gate circuit gates the output from the frequency demodulator by using the burst gate pulse signal j. As a result, the FM carrier carrier-reset by the TP carrier reset signal d' is extracted as a reference burst signal k (see FIG. 6(f)). Since the reference burst signal k corresponds to the latter half of the horizontal sync pulse, it can never affected by the sag $A_2$.

In the case when carrier resetting is performed with the double reset signal f', a reproduced video signal g'' resulted from a reproduction and demodulation causes transient distortion together with sags $A_3$ and $A_4$ at the front porch before applying de-emphasis thereto. This is due to the fact that there is no way to avoid the phase of the video carrier signal h' from being interrupted at the front porch as described above. However, since the phase of the video carrier signal h' corresponding to the horizontal sync pulse is continuous and since carrier resetting is performed at the time the frequency shift caused by the sag $A_2$ is converged, transient distortion can never occur at the leading edge of the horizontal sync pulse of the demodulated output and at the starting point of the carrier reset of the horizontal sync pulse.

Subsequently, by applying de-emphasis to the reproduced video signal g'', the sags $A_3$ and $A_4$ are corrected and a reproduced video signal g''' with less transient distortion is obtained.

In addition, adjusting the phase of the FP carrier reset pulse signal c' and that of the TP carrier reset pulse signal d' sometimes ensures the prevention of the above-mentioned transient distortion at the leading edge of the horizontal sync pulse.

[EMBODIMENT 3]

Figure 7:
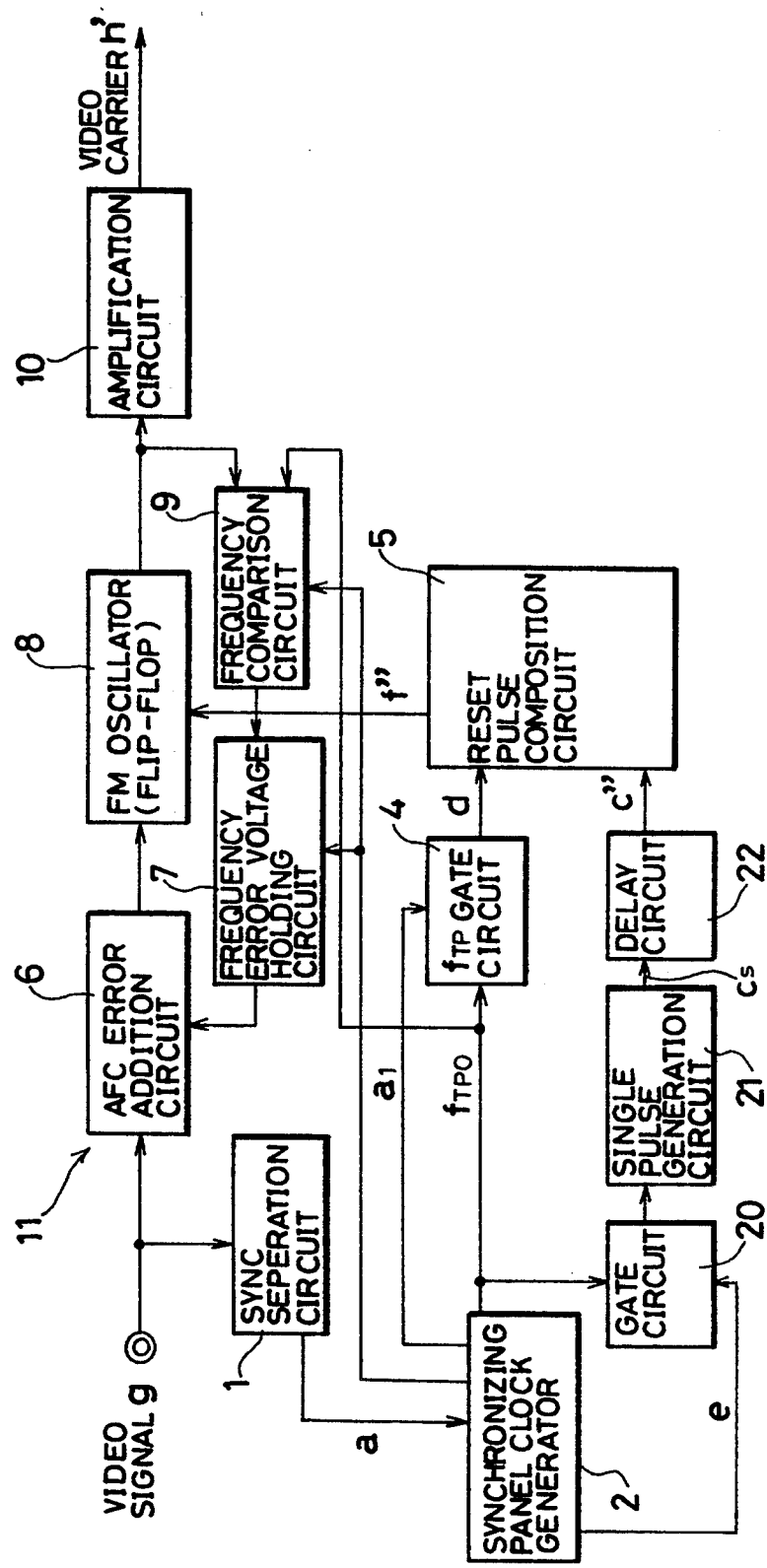
FIG. 7 is a block diagram showing another structural example of a frequency modulation circuit of the present invention.
Figure 8:
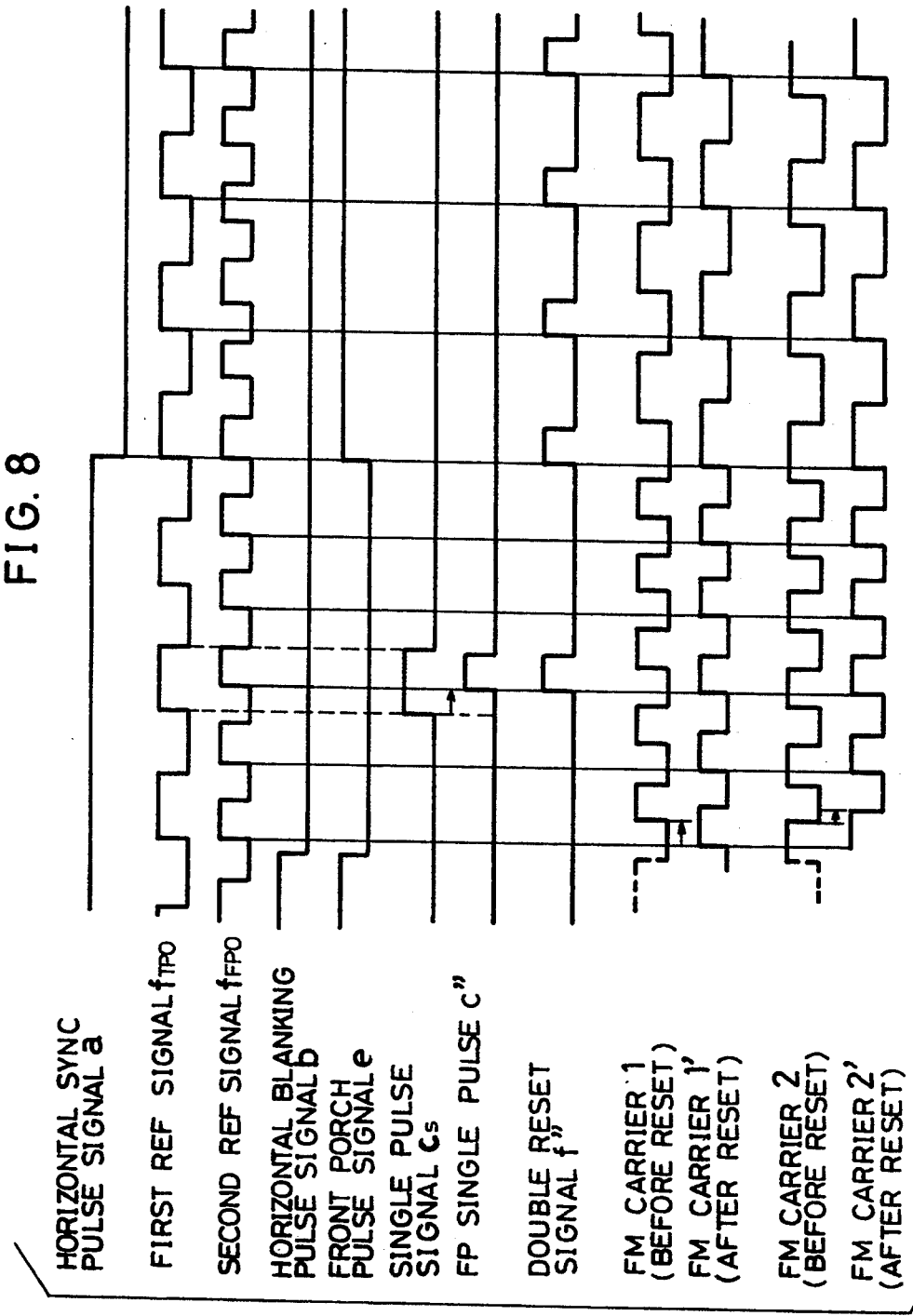
FIGS. 8(a) through 8(l) are timing charts showing signals that are released and entered between respective parts of the frequency modulation circuit of FIG. 7.
Figure 9:
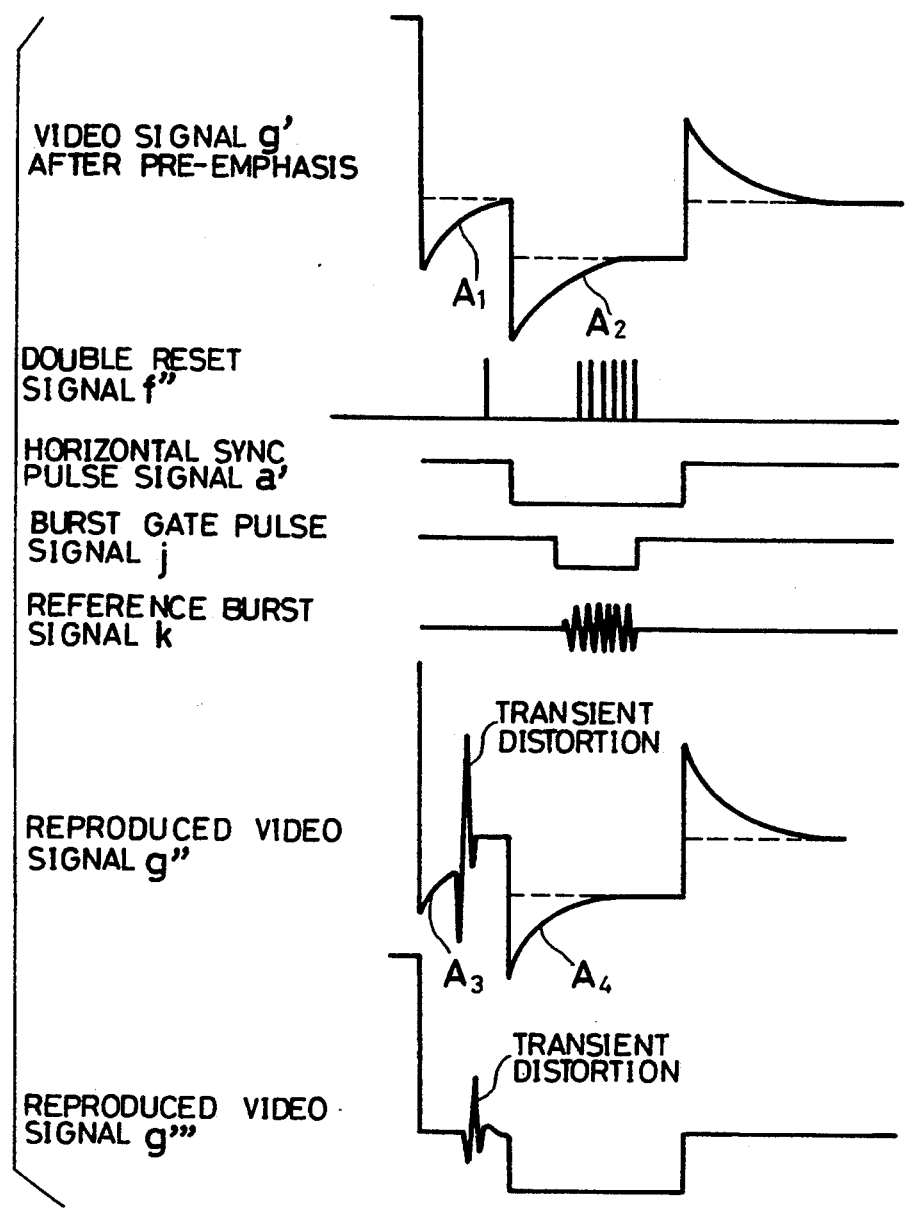
FIG. 9, which show still another embodiment of the present invention, are wave-form drawings explaining a carrier resetting operation conducted on a video signal that has been subjected to pre-emphasis operation.

Referring to FIG. 7 to FIG. 9, the following will describe another embodiment of the present invention. For convenience' sake, the same reference numerals are given to members that functions in the same manner as those members shown in the drawings of Embodiment 1, and therefore an explanation thereof will be omitted.

As illustrated in FIG. 7, a magnetic recording-reproduction apparatus of this embodiment produces an FP carrier reset signal c'', that resets the phase of an FM carrier corresponding to the front porch of a video signal, from the first REF signal, $f_{TPO}$, without using the second REF signal $f_{FPO}$. In this case, however, there is a need to constitute the FP carrier reset signal c'' with a single pulse.

The respective outputs of the synchronizing panel clock generator 2 are connected to a gate circuit 20 to which the first REF signal $f_{TPO}$ and the front porch pulse signal e are entered. The output of the gate circuit 20 is connected to the reset pulse composition circuit 5 via a single pulse generation circuit 21 and a delay circuit 22.

The gate circuit 20 transmits the first REF signal $f_{TPO}$ (see FIG. 8(b)) to the single pulse generation circuit 21 for a period of time when the front porch pulse signal e (FIG. 8(e)) is entered thereto. The single pulse generation circuit 21 extracts one cycle of the first REF signal $f_{TPO}$ in order to produce a single pulse signal Cs shown in FIG. 8(f). By delaying the rising time of the single pulse signal Cs by the delay circuit 22, the single pulse signal Cs is converted into an FP single pulse signal C'' shown in FIG. 8(g) and is then fed to the reset pulse composition circuit 5. After causing the FP single pulse signal C'' to be phase-synchronous with the second REF signal $f_{FPO}$, the reset pulse composition circuit 5 produces a double reset signal f'' shown in FIG. 8(h) by compositing the FP single pulse signal C'' and the TP carrier reset signal d, and releases it.

By the double reset signal f'' the phase of the FM carrier corresponding to the front porch is first reset and then the phase of the FM carrier corresponding to the horizontal sync pulse is reset. This enables resetting to be performed without interrupting the phase of the FM carrier corresponding to the horizontal sync pulse. In consequence, as illustrated in FIG. 9, transient distortion does not occur in the horizontal sync pulse of the frequency-demodulated reproduced video signal g'''.

[EMBODIMENT 4]

The following description will discuss still another embodiment of the present invention referring to FIGS. 10 through 13.

Figure 10:
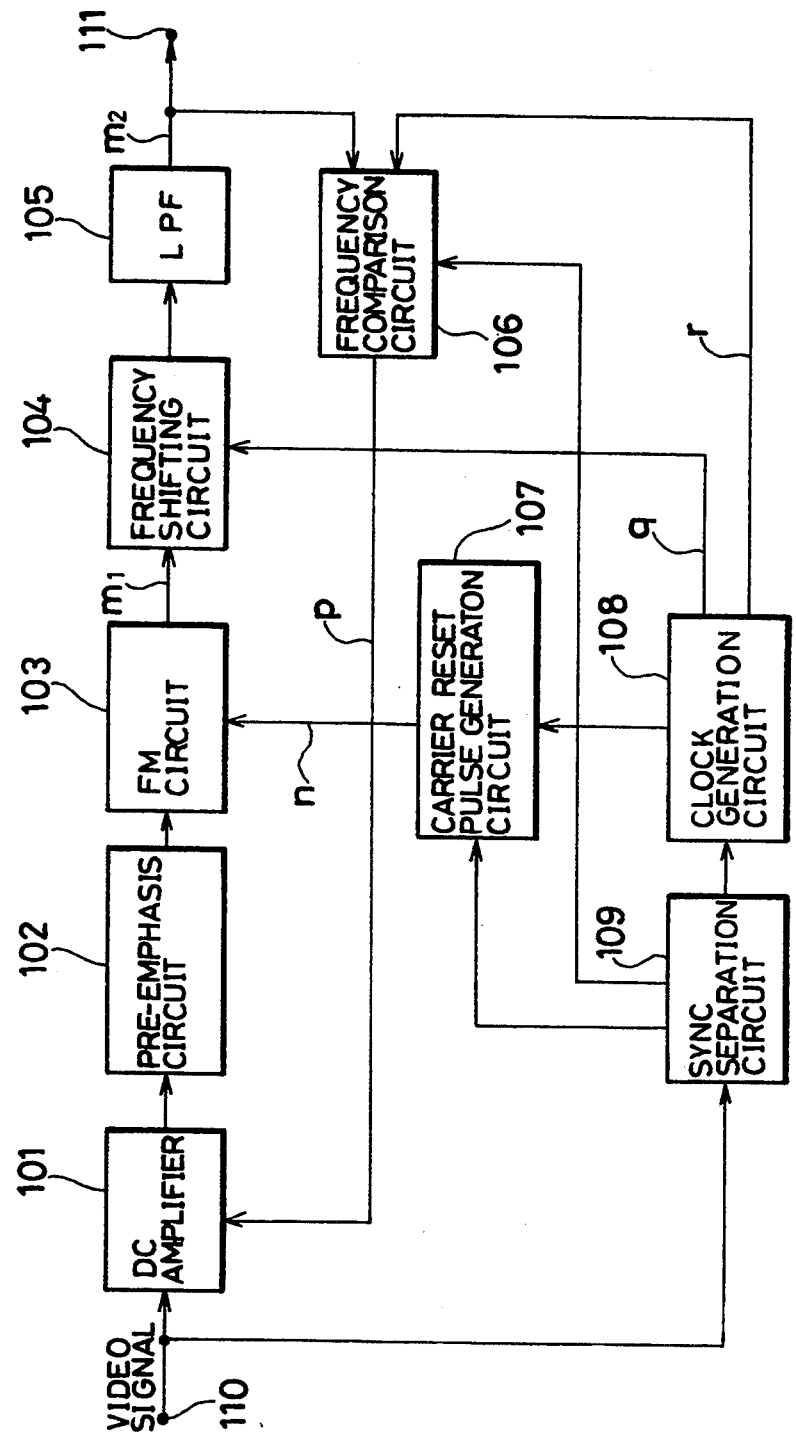
FIG. 10 is a block diagram showing the arrangement of a carrier reset frequency modulator that is provided in a magnetic recording-reproduction apparatus of the present invention.
Figure 11:
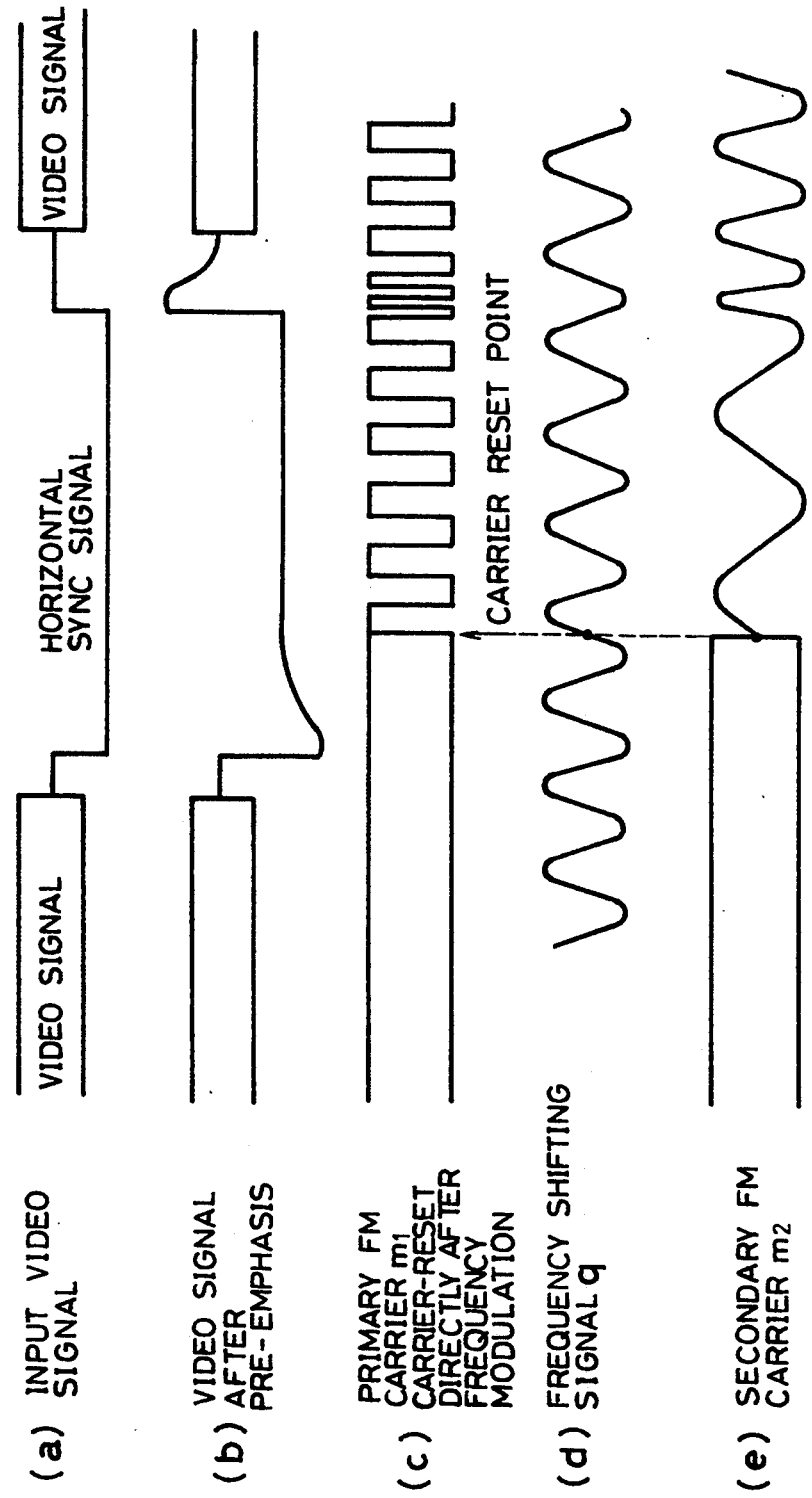
FIGS. 11(a) through 11(e) are wave-form drawings explaining a reset condition of the phase of a primary FM carrier and a synchronizing condition of the phase of a secondary FM carrier after having been subjected to a frequency-conversion.
Figure 12:
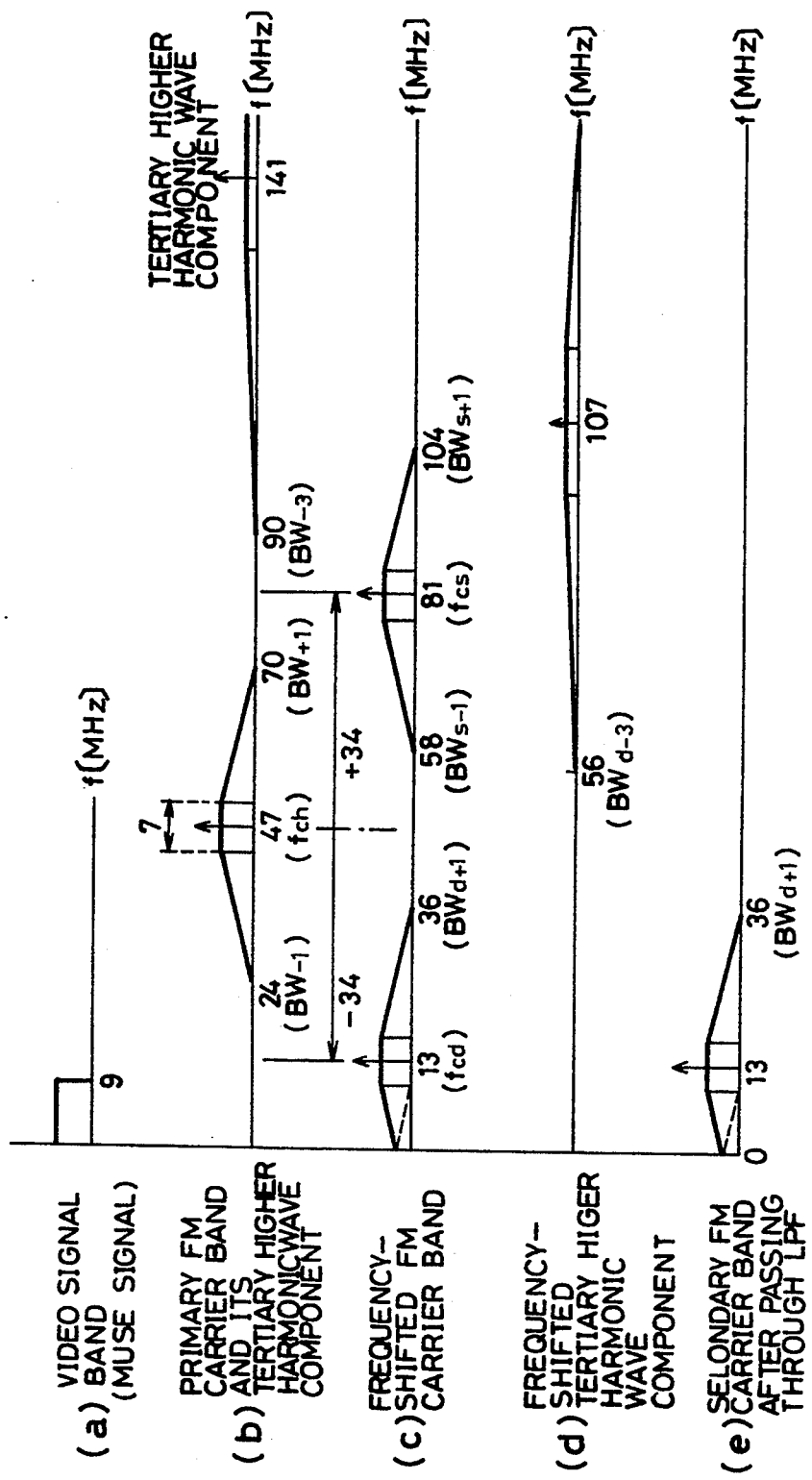
FIGS. 12(a) through 12(e) are explanatory drawings showing frequency bands of respective signals that are released and entered between respective parts of the carrier reset frequency modulator of FIG. 10.

As shown in FIG. 10, a magnetic recording-reproduction apparatus in accordance with the present invention is provided with a carrier reset frequency modulator (hereinafter referred to as a frequency modulator) including an input terminal 110 for supplying a video signal therethrough, and an output terminal 111 for outputting a FM carrier therefrom. The FM carrier outputted from the output terminal 111 is sent to a recording circuit (not shown) located in the following stage, and then recorded on a recording medium, such as a magnetic tape (not shown).

The frequency modulator further includes a DC amplifier 101 which is connected to the input terminal 110. The DC amplifier 101 is provided with a function by which a sync tip level of a horizontal sync signal included in the video signal and a pedestal level of the video signal are maintained constant regardless of an instantaneous value of the video signal. An output from the DC amplifier 101 is entered to a pre-emphasis circuit 102 for emphasizing an amplitude in a high-frequency band of the video signal in order to improve image quality.

An output of the pre-emphasis circuit 102 is connected to a FM circuit 103 with an external reset function as a frequency-modulating means (hereinafter referred to as a FM circuit). As to be described later, the FM circuit 103 produces a primary FM carrier $m_1$ with a high center frequency, whose phase is reset in response to a specified portion of the horizontal sync signal, then send the primary FM carrier $m_1$ to a frequency shifting circuit 104 located in the following stage. Further, the center frequency of the primary FM carrier $m_1$ is set many times higher than that of the conventional FM carrier.

The frequency shifting circuit 104, which is composed of, for example, an analog multiplier, converts the center frequency of the primary FM carrier $m_1$ to a low frequency band by compositing a frequency shifting signal q (to be described later) and the primary FM carrier $m_1$. An output of the frequency shifting circuit 104 is connected to a low-pass filter 105 (hereinafter referred to as LPF). Further, an output of the LPF 105 is connected to the output terminal 111. The LPF 105 produces and outputs a secondary FM carrier $m_2$ by taking out both a sum component of the primary FM carrier $m_1$ and the frequency shifting signal q, and higher harmonic wave components.

On the other hand, the frequency modulator is provided with a sync separation circuit 109 that is connected to the input terminal 110. The sync separation circuit 109 extracts a horizontal sync pulse included in the video signal. An output terminal of the sync separation circuit 109 is connected to a clock generation circuit 108. The clock generation circuit 108 produces a master clock signal with a stable frequency whose phase is synchronous with the horizontal sync pulse.

A carrier reset pulse generation circuit 107 is connected to respective output terminals of the clock generation circuit 108 and a sync separation circuit 109. The carrier reset pulse generation circuit 107 produces a carrier reset pulse signal n (hereinafter referred to as a reset signal) according to both the horizontal sync signal and the master clock signal which are supplied respectively from the clock generation circuit 108 and the sync separation circuit 109. Then, the reset signal n is supplied from carrier reset pulse generation circuit 107 to the FM circuit 103 so as to reset the phase of the primary FM carrier $m_1$.

Further, the clock generation circuit 108 produces the frequency shifting signal q whose phase is synchronous with the horizontal sync pulse. The frequency shifting signal q is inputted to the frequency shifting circuit 104 from the clock generation circuit 108. Further, the clock generation circuit 108 produces an AFC reference frequency signal r (hereinafter referred to as an AFC signal) in response to the master clock signal.

The secondary FM carrier $m_2$, the AFC signal r and the horizontal sync signal are inputted to the frequency comparison circuit 106. The horizontal sync signal is entered from the sync separation circuit 109 to the frequency comparison circuit 106 as a gate signal whereby the frequency of the horizontal sync signal is compared with the frequency of the AFC signal r for each horizontal scanning cycle, i.e., from a leading edge to the next leading edge.

Based on a result of the frequency comparison, a frequency error signal p having a predetermined voltage level is produced. The frequency error signal p is sent to a DC amplifier 101 as a negative feed-back and then superimposed to the video signal. As a result, an instantaneous frequency of a carrier generated in the FM circuit 103 always coincides with the frequency of the AFC signal r.

Figure 13:
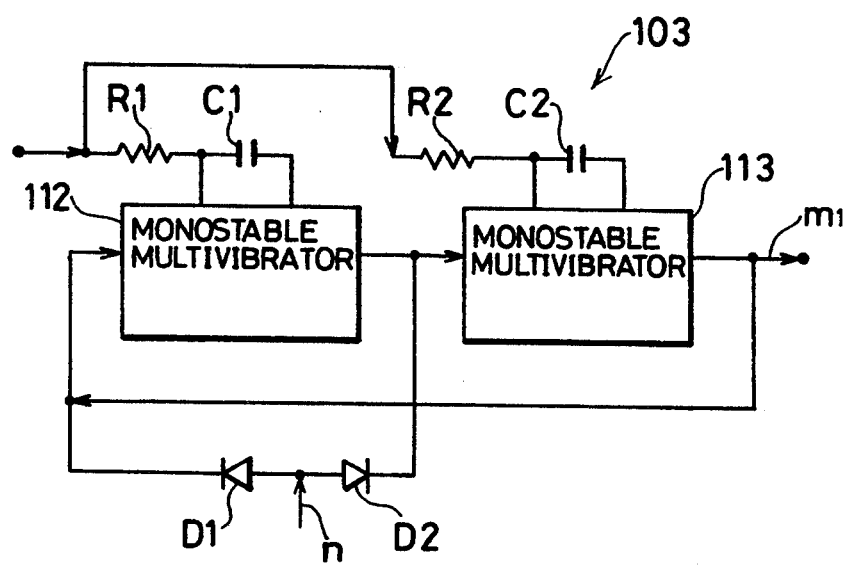
FIG. 13 is a circuit diagram showing a frequency modulation circuit having an external reset function, wherein monostable multivibrators are employed.
Figure 14:
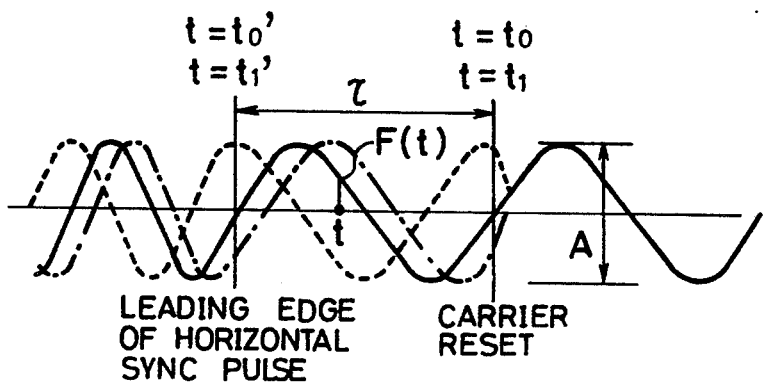
Figure 15:
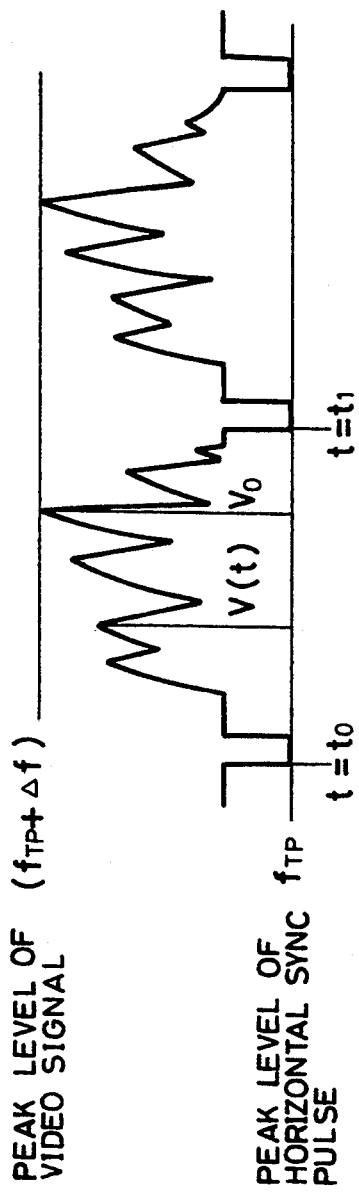
Figure 16:
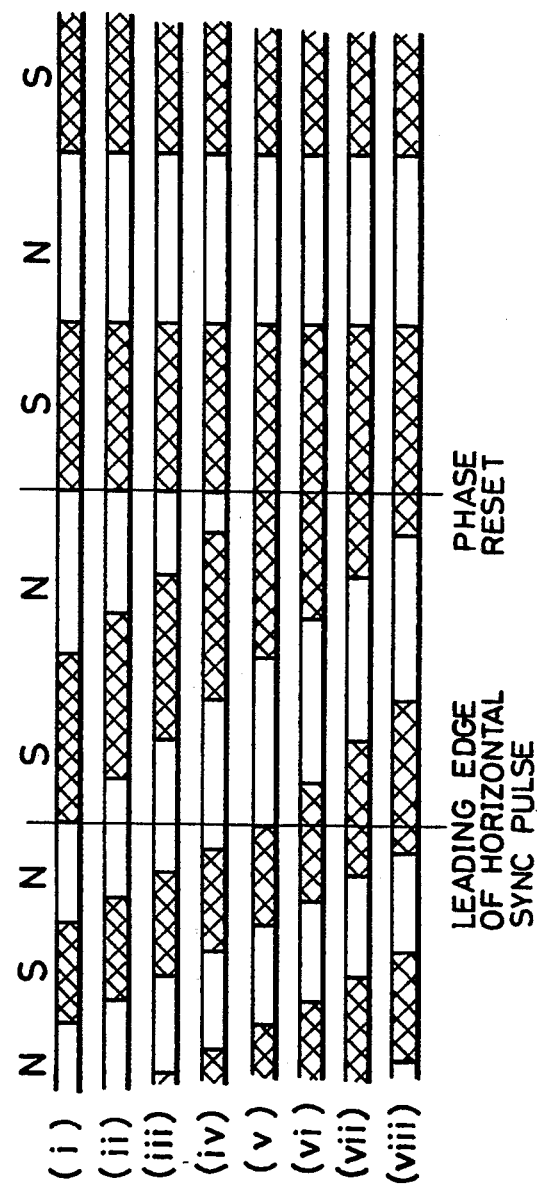
Figure 17:
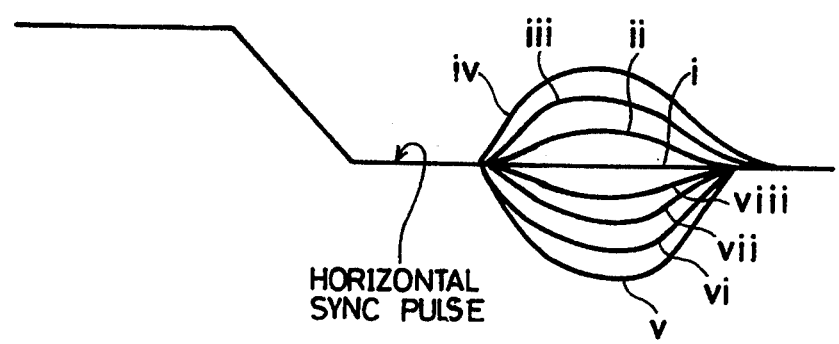
Figure 18:
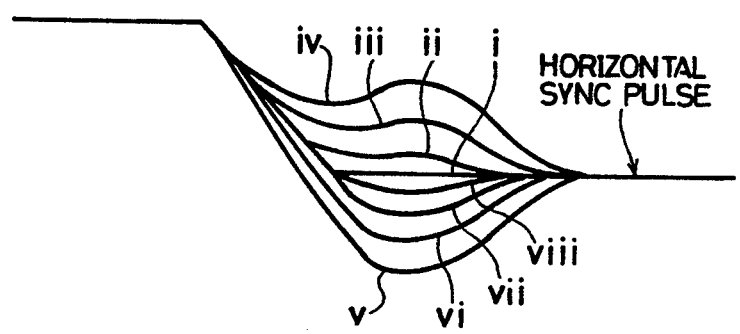
Figure 19:
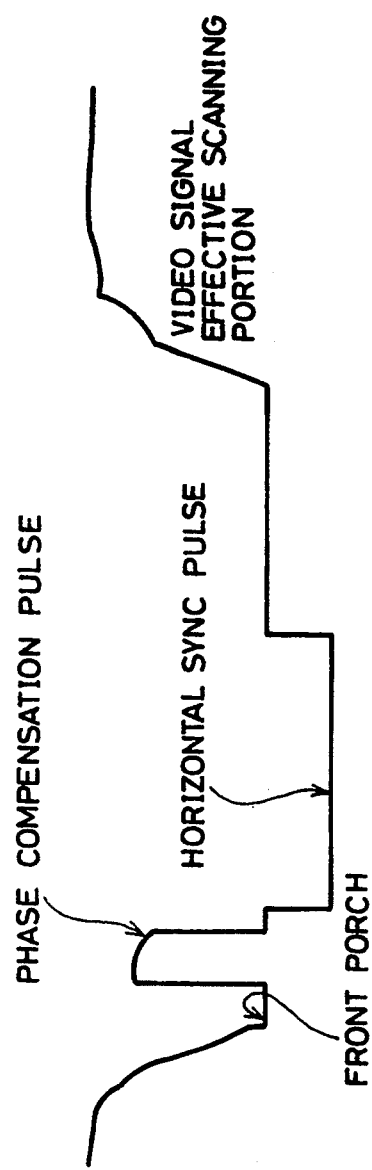
Figure 20:
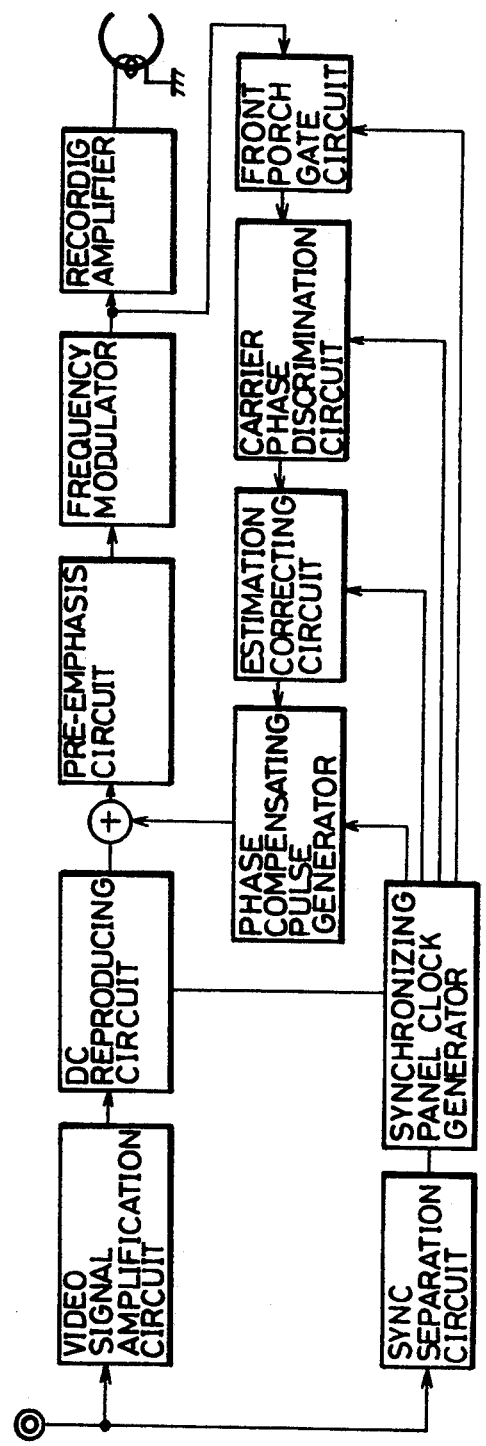
Figure 21:
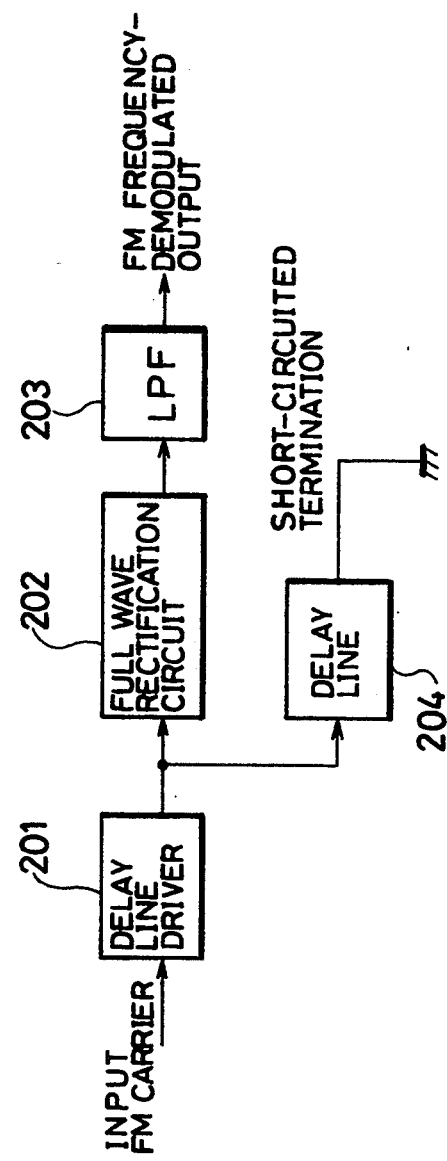
Figure 22:
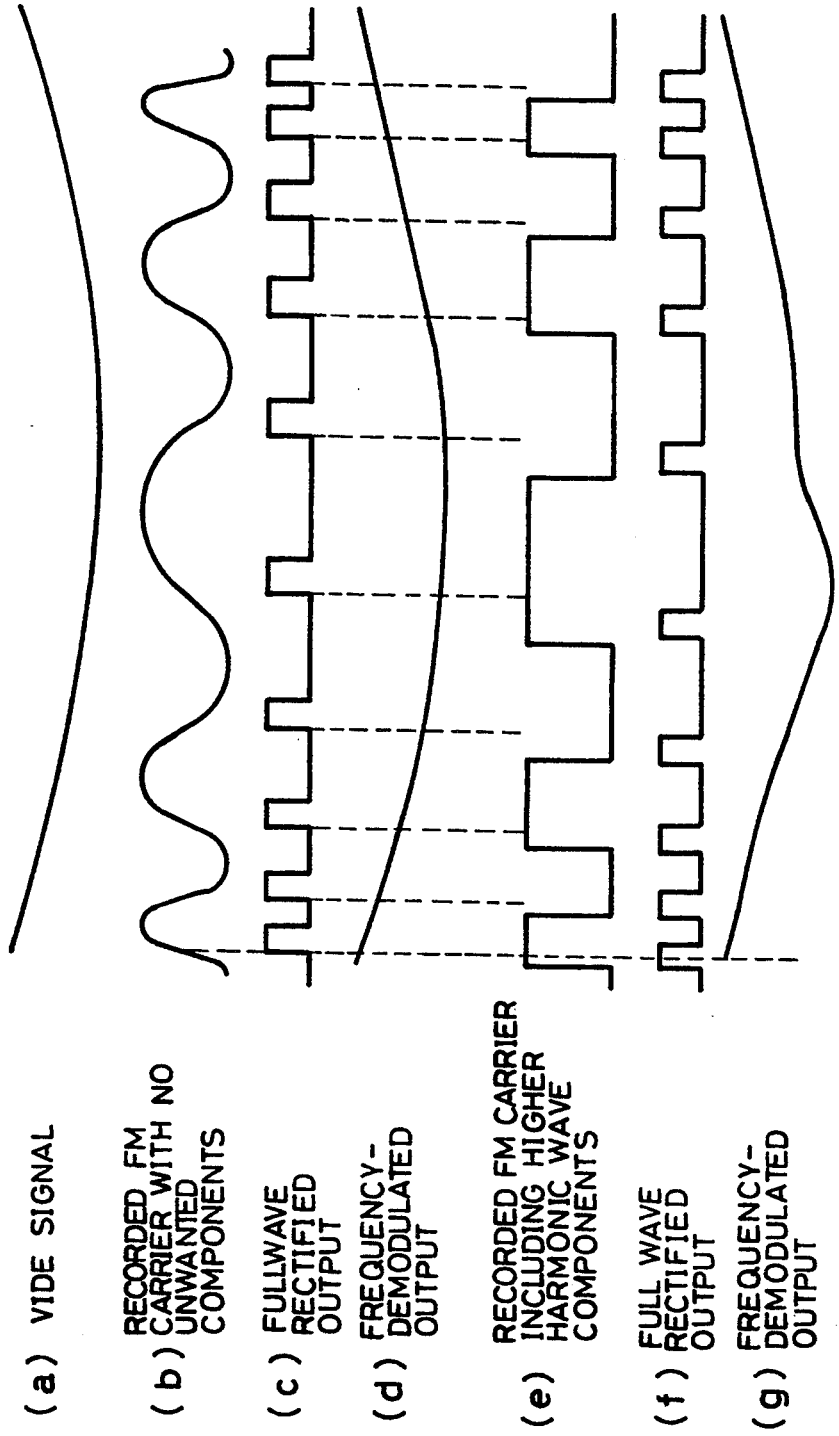

As shown in FIG. 13, the FM circuit 103 includes a pair of monostable multivibrators 112 and 113 (hereinafter referred to as a vibrator). An inverse output from the vibrator 112 enters the vibrator 113, likewise, an inverse output from the vibrator 113 enters the vibrator 112. Capacitors C1 and C2 are respectively connected to the vibrators 112 and 113. Further, each end of resisters R1 and R2 is connected to the capacitor C1 and C2. The other end of the resistors R1 and R2 are respectively connected to an output terminal of the pre-emphasis circuit 102.

As a result, the FM circuit 103 generates a carrier at a predetermined time constant. The time constant is determined by the resisters R1, R2 and the capacitors C1, C2. The FM circuit 103 also outputs the primary FM carrier $m$: by frequency-modulating the carrier according to the video signal entered from the pre-emphasis circuit 102.

A cathode of a diode D1 is connected to an input terminal of the vibrator 112 that is connected to the inverse output terminal of the vibrator 113. Likewise, a cathode of a diode D2 is connected to an input terminal of the vibrator 113 that is connected to the inverse output terminal of the vibrator 112. An anode of the diode D1 is connected to an anode of the diode D2. The carrier reset pulse generation circuit 107 sends the reset signal n to the diodes D1 and D2 through the anodes.

With the above-mentioned arrangement, when the video signal of FIG. 11(a) is entered to the sync separation circuit 109 through the input terminal 110, the horizontal sync signal is separated from the video signal by the sync separation circuit 109. In the meantime, the video signal is entered to the DC amplifier 101 through the input terminal 110 wherein the frequency error signal p transmitted from the frequency comparison circuit 106 is superimposed on the video signal. Thereafter, the video signal is entered to the pre-emphasis circuit 102 for emphasizing the amplitude of the high-frequency band of the video signal.

As shown in FIG. 11(b), an overshoot appears, for example, in leading edge and trailing edge of the horizontal sync pulse. As a result, the carrier reset pulse generation circuit 107 produces the reset signal n for resetting the phase of the primary FM carrier $m$: when obtained a state where a frequency shift of the primary FM carrier $m$: has been returned within a certain range. This prevents an occurrence of a phase shift due to the overshoot that appears in the leading edge and trailing edge of the horizontal sync pulse. Further, the reset signal n is produced from the master clock signal whose phase is synchronous with the horizontal sync pulse.

As described above, the FM circuit 103 sends the primary FM carrier $m_1$, whose phase is reset by the reset signal n as shown in FIG. 11(c), to the frequency shifting circuit 104. Further, the clock generation circuit 108 sends the frequency shifting signal q, for example, expressed by a sinusoidal wave to the frequency shifting circuit 104. The frequency shifting circuit 104 composites the phase-reset primary FM carrier $m_1$ and the frequency shifting signal q.

As a result, the LPF 105 extracts the secondary FM carrier $m_2$ shown in FIG. 11(e) which is a difference component between the frequency of the primary FM carrier $m_1$ and the frequency of the frequency shifting signal q. It is an essential characteristic of the present invention that the phases of the primary FM carrier $m_1$, the frequency shifting signal q and the secondary FM carrier $m_2$ are all synchronized.

As shown in FIG. 12(a), if the video signal is a MUSE (Multiple Sub-Nyquist Sampling Encoding) signal having a 9 MHz frequency band, for example, a gray level frequency $f_{ch}$ of the primary FM carrier $m_1$, the deviation after frequency modulation, the degree of pre-emphasis on the MUSE signal and the frequency $f_{sh}$ of the frequency shifting signal q can be set respectively 47 MHz, ±3.5 MHz, 12 dB (approximately 4 times) and 34 MHz.

As shown in FIG. 12(b), suppose that the frequency band of the FM carrier is 2×(the deviation+the frequency band of the video signal). Then, as shown in FIG. 12(b), an upper limit $BW_{+1}$ and a lower limit $BW_{-1}$ in the frequency band of the primary FM carrier $m_1$ respectively are $$BW_{+1} = 47 + (3.5 \times 4 + 9) = 70 [MHz]$$

$$BW_{-1} = 47 - (3.5 \times 4 + 9) = 24 [MHz.]$$

Respective gray level frequencies $f_{cd}$ and $f_{cs}$ of the difference component and the sum component both contained in a composite signal of the primary FM carrier $m_1$ and the frequency shifting signal q are $$f_{cd} = 47 - 34 = 13 [MHz]$$

$$f_{cs} = 47 + 34 = 81 [MHz].$$

The upper limit value $BW_{d+1}$ of the frequency band of the difference component is $$BW_{d+1} = 13 + (3.5 \times 4 + 9) = 36 [MHz] \quad (1).$$

The lower limit value $BW_{s-1}$ of the frequency band of the sum component is $$BW_{s-1} = 81 - (3.5 \times 4 + 9) = 58 [MHz] \quad (2).$$

As is clear from the obtained values (1) and (2), when the gray level frequency $f_{ch}$ of the primary FM carrier $m_1$ and the frequency $f_{sh}$ of the frequency shifting signal q are set as described above, the frequency band of the difference component and that of the sum component are not overlapped. As a result, the LPF 105 can isolate the difference component from the composite signal, thereby extracting only the difference component.

The lower limit value $BW_{-3}$ of the frequency band of the tertiary higher harmonic wave component in the primary FM carrier $m_1$ is $$BW_{-3} = 47 \times 3 - (3.5 \times 4 \times 3 + 9) = 141 - 51 = 90 [MHz] \quad (3).$$

The lower limit value $BW_{d-3}$ of the frequency band of the tertiary higher harmonic wave component included in the difference component is $$BW_{d-3} = (47 \times 3 - 34) - (3.5 \times 4 \times 3 + 9) = 56 [MHz] \quad (4),$$

As is clear from the obtained values (3) and (4), the frequency band of the difference component and that of the tertiary higher harmonic wave component included in the difference component are not overlapped. Thus, like the previously mentioned case, the LPF 105 separates the tertiary harmonic wave component from the difference component. As a result, the tertiary harmonic wave component is removed.

In the case where a method for resetting a carrier is adopted which requires several cycles of the FM carrier before the phase of the FM carrier is converged on the phase of the horizontal sync signal, although the required wave number of the FM carrier is the same, carrier resetting in a high-frequency should be performed rather than that in a low-frequency in order to shorten the time required for the phase-conversion. More concretely, the frequency modulator in accordance with the present invention, can shorten scratches of the frequency-demodulated output which are caused by the discontinuity of the phase of the FM carrier before and after the carrier reset.

As aforementioned, the present invention is arranged such that the carrier reset is performed on the primary FM carrier having a high frequency that is to be converted to a low frequency, thereby obtaining a secondary FM carrier having only a few unwanted higher harmonic wave components. As a result, a highly accurate jitter detection signal can be achieved by using as a reference burst signal an FM carrier gated by the horizontal sync signal demodulated from the reproduced FM carrier. Moreover, since the secondary FM carrier has only a few unwanted components, the accuracy of the demodulation increases, thereby improving image quality.

Further, since the automatic frequency control circuit (AFC circuit) is provided, the frequency of the carrier generated by the frequency modulator is no longer adversely affected by temperature drift etc. of the frequency modulator and the frequency shifting circuit.

Additionally, in order to record and reproduce a TCI signal which is made by narrowing a wide-band of a video signal, at least the following structural components are necessary:

(a) a frequency modulator constituting an AFC circuit.

(b) a time-base correction circuit having a memory in which data for time-base correction are written.

(c) a reference signal generation circuit for releasing a sinusoidal wave and a pulse signal at a reference frequency.

(d) a timing signal generation circuit for resetting the phase of an FM carrier to a reference phase.

(e) a frequency demodulator for frequency-demodulating a reproduced FM carrier during reproduction.

(f) a horizontal sync pulse detection circuit for detecting a horizontal sync pulse from an output of the frequency demodulator and for releasing the same.

(g) a gate circuit for generating a burst signal by gating the FM carrier by the use of the leading edge of the horizontal sync pulse entered from the horizontal sync pulse detection circuit, the phase of the FM carrier having been reset in the frequency demodulator.

(h) a trigger pulse generation circuit for releasing to the time-base correction circuit a trigger pulse that is used for writing the data in the memory of the time-base correction circuit by detecting a predetermined zero-cross point of the burst signal at the leading edge or the trailing edge of the horizontal sync pulse that is entered from the horizontal sync pulse detection circuit.

During recording, the reference signal generation circuit directs from a master oscillator, provided in the frequency demodulator, a first reference pulse signal having a first reference frequency and a second reference pulse having a second reference frequency; sets each of the reference frequencies to an integer multiple of the horizontal scanning frequency; and permits the phases of the reference pulse signals to coincide with each other at the leading edge of the horizontal sync pulse.

The timing signal generation circuit is provided with a third timing signal generation circuit and a fourth timing signal generation circuit.

The third timing signal generation circuit is applied for:

(1) constituting an AFC circuit together with the frequency modulator, and controlling so as to permit the first reference frequency to coincide with the FM frequency corresponding to the peak level of the horizontal sync pulse.

(2) generating a first reset pulse signal by gating the first reference pulse signal only for a period corresponding to the latter half of the horizontal sync pulse.

(3) resetting the phase of the FM carrier corresponding to the peak level of the horizontal sync pulse to be the reference phase for each horizontal scanning cycle by the use of the first reset pulse signal.

Further, the fourth timing generation circuit is applied for:

(1) constituting an AFC circuit together with the frequency modulator, and controlling so as to permit the second reference frequency to coincide with the FM frequency corresponding to the level of the front porch.

(2) generating a second reset pulse signal by gating the second reference pulse signal only for a period corresponding to the latter half of the front porch.

(3) resetting the phase of the FM carrier corresponding to the level of the front porch to be the reference phase for each horizontal scanning cycle by the use of the second reset pulse signal.

The reproduced FM carrier is entered to the frequency demodulator by way of a head amplifier and an equalizer, the demodulated output is entered to the time-base correction circuit. The time-base correction circuit corrects a time-base error of the demodulated output and thereby reproduces the video signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording-reproduction apparatus comprising:

frequency modulating means including a carrier oscillator for generating a carrier, for modulating a frequency for the carrier according to the amplitude of a video signal including a front porch and a horizontal sync pulse so as to generate an FM carrier;

pulse signal generating means for generating a master clock signal, a first reference pulse signal and a second reference pulse signal, the first reference pulse signal having a first reference frequency corresponding to a peak level of the horizontal sync pulse, the second reference pulse signal having a second reference frequency corresponding to a level of the front porch, the first reference frequency and the second reference frequency being phase-synchronous with each other at a leading edge of the horizontal sync pulse, and each of the first and second reference frequencies being set to an integer multiple of the horizontal scanning frequency; and carrier resetting means for conducting a two-step carrier resetting operation on the FM carrier for each horizontal scanning cycle in such a manner that the phase of the FM carrier is permitted to coincide with the phase of the second reference pulse signal at the front porch and is also permitted to coincide with the phase of the first reference pulse signal at the leading edge of the horizontal sync pulse, whereby recording of the video signal is conducted according to a reset FM carrier that has undergone the two-step carrier resetting operation, and a portion of the reset FM carrier having the first reference frequency is extracted as a reference burst signal that is used for correcting jitter during reproduction of the video signal.

2. The magnetic recording-reproduction apparatus as set forth in claim 1, further comprising:

frequency comparing means for: receiving the first reference pulse signal from the pulse signal generating means; receiving the FM carrier from the frequency modulating means; comparing a first FM frequency of a part of the reset FM carrier corresponding to the horizontal sync pulse with the first reference frequency; and negatively feeding back to an input of the frequency modulating means a correction voltage corresponding to a difference between the first FM frequency and the first reference frequency, wherein the frequency modulating means and the frequency comparing means constitute an automatic frequency control circuit.

3. The magnetic recording-reproduction apparatus as set forth in claim 1, wherein:

the pulse signal generating means generates a horizontal sync signal created by extracting the horizontal sync pulse, and a front porch pulse signal having a pulse width corresponding to the front porch and having a trailing edge that is synchronous with the leading edge of the horizontal sync pulse; and the carrier resetting means comprises a first timing signal generating means, a second timing signal generating means and a reset pulse composition means; the first timing signal generating means receiving the first reference pulse signal from the pulse signal generating means and releasing a first pulse train that is phase-synchronous with the first reference pulse signal by using the horizontal sync signal as a first gate signal so as to send the first pulse train to the reset pulse composition means; the second timing signal generating means receiving the second reference pulse signal from the pulse signal generating means and releasing a second pulse train that is phase-synchronous with the second reference pulse signal by using the front porch pulse signal as a second gate signal so as to send the second pulse train to the reset pulse composition means; the reset pulse composition means receiving the second pulse train and the first pulse train in this order and releasing to the frequency modulating means a double reset signal constituted of the second pulse train and the first pulse train, whereby the two-step carrier resetting operation is conducted by using the double reset signal.

4. The magnetic recording-reproduction apparatus as set forth in claim 1, wherein:

the pulse signal generating means generates a horizontal sync signal created by extracting the horizontal sync pulse, and also generates a front porch pulse signal having a pulse width corresponding to the front porch and having a trailing edge that is synchronous with the leading edge of the horizontal sync pulse; and the carrier resetting means comprises a first timing signal generating means, a second timing signal generating means and a reset pulse composition means; the first timing signal receiving the first reference pulse signal from the pulse signal generating means and generating a first pulse train that is phase-synchronous with the first reference pulse signal by using the horizontal sync signal as a first gate signal so as to send the first pulse train to the reset pulse composition means in correlation with a latter half of the horizontal sync pulse; the second timing signal generating means receiving the second reference pulse signal from the pulse signal generating means and generating a second pulse train that is phase-synchronous with the second reference pulse signal by using the front porch pulse signal as a second gate signal so as to send the second pulse train to the reset pulse composition means in correlation with a latter half of the front porch; the reset pulse composition means receiving the second pulse train and the first pulse train in this order and releasing to the frequency modulating means a double reset signal constituted of the second pulse train and the first pulse train, whereby the two-step carrier resetting operation is conducted by using the double reset signal in time with a convergence of frequency shifts that are caused by the pre-emphasis applied to the video signal.

5. The magnetic recording-reproduction apparatus as set forth in claim 2, wherein the pulse signal generating means releases a horizontal sync signal created by extracting the horizontal sync pulse;

the frequency comparing means comprises a frequency comparison circuit, a frequency error voltage holding circuit, and an AFC error addition circuit, the output of the frequency modulating means being negatively fed back to the frequency modulating means after passing through the frequency comparison circuit, the frequency error voltage holding circuit, and the AFC error addition circuit in sequency, the frequency comparison circuit receiving the horizontal sync signal from the pulse signal generating means and carrying out a comparison of the first FM frequency and the first reference frequency for each horizontal scanning cycle, the frequency error voltage holding circuit holding the correction voltage for one horizontal scanning period, and the AFC error addition circuit supplying to the frequency modulating means a corrected video signal created by adding the correction voltage to the video signal.

6. The magnetic recording-reproduction apparatus as set forth in claim 1, where the pulse signal generating means releases a horizontal sync signal created by extracting the horizontal sync pulse, and a front porch pulse signal having a pulse width corresponding to the front porch having a trailing edge that is synchronous with the leading edge of the horizontal sync pulse, the carrier resetting means comprising a timing signal generating means, single pulse generating means, delay means and reset pulse composition means, the timing signal generating means receiving the first reference pulse signal from the pulse signal generating means and releasing a first pulse train that is phase-synchronous with the first reference pulse signal by using the horizontal sync signal as a first gate signal, the first pulse train being sent to the reset pulse composition means, the single pulse generating means for generating a first single pulse that is phase-synchronous with the first reference pulse signal by using the first reference pulse signal, the delay means generating a second single pulse by making the first single pulse phase-synchronous with the second reference pulse signal so as to send the second single pulse to the reset pulse composition means, and the reset pulse composition means receiving the second single pulse and the first pulse train in this order, and releasing to the frequency modulating means a double reset signal constituted of the second single pulse and the first pulse train, whereby the carrier resetting operation is conducted by using the double reset signal.

* * * * *